United States Patent
Ishiwatari

(10) Patent No.: US 7,177,633 B2
(45) Date of Patent: Feb. 13, 2007

(54) REMOTE CONTROL SYSTEM, REMOTE CONTROL APPARATUS, REMOTE CONTROL METHOD, PROGRAM FOR IMPLEMENTING THE METHOD, AND ELECTRONIC APPARATUS

(75) Inventor: Masumi Ishiwatari, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 410 days.

(21) Appl. No.: 10/771,751

(22) Filed: Feb. 3, 2004

(65) Prior Publication Data

US 2004/0157558 A1 Aug. 12, 2004

(30) Foreign Application Priority Data

Feb. 4, 2003 (JP) ............................. 2003-027570
Feb. 4, 2003 (JP) ............................. 2003-027571

(51) Int. Cl.
*H04M 3/00* (2006.01)
*H04B 1/06* (2006.01)

(52) U.S. Cl. ................... 455/418; 455/420; 455/151.1; 455/352; 348/14.05; 340/5.3

(58) Field of Classification Search ........ 455/418–420, 455/41.1–41.2, 151.1, 151.2, 92, 352; 340/426.13, 340/426.15, 426.36, 5.3–5.33, 5.7–5.74, 340/525.24; 348/14.05, 734
See application file for complete search history.

(56) References Cited

U.S. PATENT DOCUMENTS

| | | | | |
|---|---|---|---|---|
| 5,115,236 | A | * | 5/1992 | Kohler .................. 340/825.69 |
| 5,182,551 | A | * | 1/1993 | Goto ..................... 340/825.24 |
| 5,436,853 | A | * | 7/1995 | Shimohara .................. 702/79 |
| 6,225,916 | B1 | * | 5/2001 | Sugimoto et al. ...... 340/825.69 |

FOREIGN PATENT DOCUMENTS

| | | | | |
|---|---|---|---|---|
| JP | 06153281 | A * | 5/1994 | .................. 455/92 |
| JP | 8-163531 | | 6/1996 | |

* cited by examiner

*Primary Examiner*—Simon Nguyen
(74) *Attorney, Agent, or Firm*—Morgan & Finnegan LLP

(57) ABSTRACT

A remote control system which can reliably provide desired control while saving power. A remote control apparatus is capable of carrying out two-way wireless communication with an apparatus to be controlled. A control signal corresponding to a key switch for remote control is repeatedly transmitted while the key switch is being operated. Repeated transmission of the control signal is inhibited in accordance with reception of a predetermined signal from the apparatus to be controlled.

11 Claims, 21 Drawing Sheets

FIRST LEADER CODE

SECOND LEADER CODE

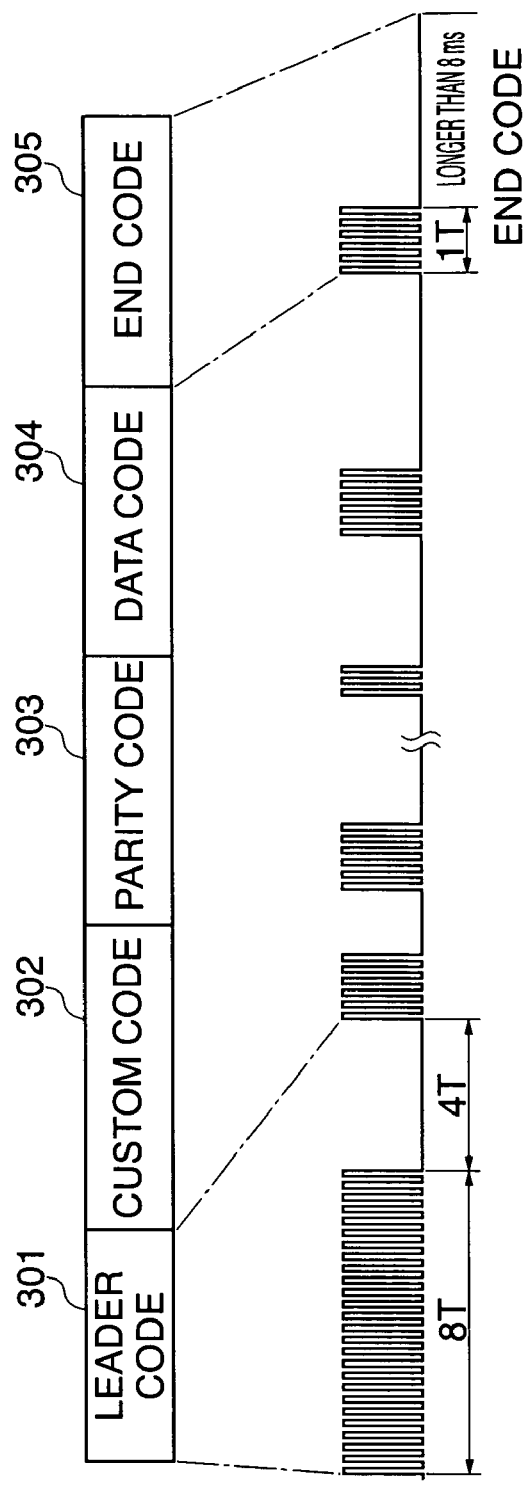
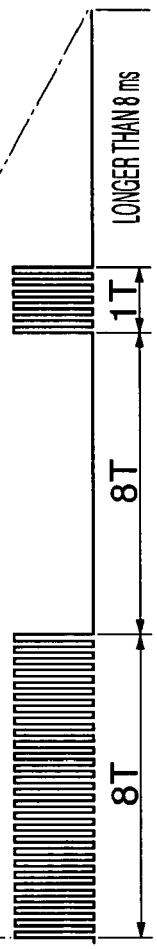
FIG. 21A
FIG. 21B
FIG. 21C
FIG. 21D

REMOTE CONTROL SYSTEM, REMOTE CONTROL APPARATUS, REMOTE CONTROL METHOD, PROGRAM FOR IMPLEMENTING THE METHOD, AND ELECTRONIC APPARATUS

BACKGROUND OF THE INVENTION

1. Field of the Invention

The present invention relates to a remote control system, a remote control apparatus, and a remote control method, which carry out remote control (remote operation) of an electronic apparatus by means of e.g. infrared light, as well as to a program for implementing the method and an electronic apparatus which is remotely controlled. In particular, the present invention relates to a remote control system, a remote control apparatus, and a remote control method, which carry out remote control of an electronic apparatus by sequentially transmitting control signals for providing predetermined control, as well as to a program for implementing the method and an electronic apparatus which is remotely controlled.

2. Description of the Related Art

Conventionally, in a remote control apparatus (hereinafter referred to as "the remote controller") which remotely controls an electronic apparatus such as a television set or a vide camera by means of infrared light, in the case where, for example, the volume of a television set or the direction of a video camera which captures an image are controlled, the operator continuously depress a control key for controlling the volume or the direction to sequentially transmit control signals to the electronic apparatus so as to sequentially change the volume or the direction, and stops depressing the control key when a desired volume or direction is obtained.

In response to the depression of the control key, the remote controller transmits a light signal (control signal) with a data format in FIG. 21A once. Specifically, FIG. 21A is a view showing a code system in the format of the light signal; reference numeral 301 denotes a leader code. Reference numeral 302 denotes a custom code for identifying e.g. the manufacturer of an electronic apparatus or the model of a set for which the remote controller is used. Reference numeral 303 denotes a parity code; 304, a data code; and 305, an END code which is called a trailer.

FIG. 21B is a view showing a signal waveform applied to a light emitting diode (LED), and for example, the leader code 301 is comprised of a signal present section with a duration of 8T ("T" means the basic time unit of a code), and a signal absent section with a duration of 4T.

On the other hand, if the control key is continuously depressed, the remote controller continuously transmits a repeat code 306 with a format in FIG. 21C at predetermined time intervals of about 100 ms, for example. FIG. 21D is a view showing the signal waveform of the repeat code 306, which is applied to the light emitting diode (LED).

The above-mentioned formats have been disclosed in "Transistor Gijyutsu, November 1996 issue" (CQ Publishing Co., LTD.), and detailed description is therefore omitted.

Also, Japanese Laid-Open Patent Publication No. H08-163531 has disclosed a technique for controlling a VTR via a CATV using a remote controller therefor in a system which controls the VTR by means of an infrared control unit attached to the CATV.

This publication discloses an arrangement that a control signal is transmitted via a remote controller, (light), CATV, (cable), the infrared control unit, (light), and the VTR in this order, and to prevent abnormal reception due to collision of light from the remote controller and light from the infrared control unit, the publication further discloses a technique according to which a control signal is transmitted only immediately after a key of the remote controller is depressed, and immediately upon receiving the control signal, the infrared control unit transmits a control signal to the VTR, and a technique according to which a control signal is transmitted immediately after a key of the remote controller is depressed, and a control signal is again transmitted when the key ceases to be depressed, and while the remote controller transmits no control signal, the infrared control unit transmits a control signal to the VTR.

The above-mentioned repeat code 306, however, is only indicative of "the same as before", and therefore in the case where an electronic apparatus as an apparatus to be controlled fails to receive the initial data (leader code 301), what kind of instructed operation should be executed cannot be recognized, and thereafter, even if the repeat code 306 is transmitted, the electronic apparatus only has to make the repeat code 306 through.

Further, according to the techniques disclosed in Japanese Laid-Open Patent Publication No. H08-163531, a signal is transmitted from the remote controller only once or twice, and hence the CATV can fail to receive an infrared light signal with a high possibility, and the same problem arises as in the case where the repeat code 306 is used.

In either case, the operator of the remote controller misbelieves that the remote controller or the apparatus to be controlled has failed since the apparatus to be controlled does not operate in response to the depression of a key, or misbelieves that an intended key of the remote controller has not yet been turned on, and therefore continuously depresses the key with an excessive force, and therefore the remoter controller is not easy to use.

There has been known a remote controller which repeatedly transmits the same control signal during the depression of a key, and this remote controller can solve the above described problems since the same control signal as the previous one is repeatedly transmitted even if an apparatus to be controlled has failed to receive the first signal.

However, in the case of a key such as a channel switch key for a TV set or a video signal input switch key other than a key used for e.g. volume control which requires an instruction for continuous operation, a control signal is continuously transmitted although the control signal does not have to be repeatedly transmitted even if the key is continuously depressed (this also applies to the case where the repeat code 306 is transmitted), and this wastes a battery for the remote controller.

Here, in the case where the key is slowly depressed once, the key is usually depressed for several 100 ms, but the transmission of one signal is completed in several 10 ms. Therefore, when the key is depressed, a control signal is unconsciously transmitted about four or five times. Thus, even if the operator tries to prevent the waste of battery for the remote controller by consciously decreasing the period of time for which the key is depressed, there is a limit.

To address this problem, it can be envisaged that a control signal is transmitted only once even if a key which does not require an instruction for continued operation is continuously depressed.

In this case, however, since one signal is transmitted for only a short period of time, i.e. about several 10 ms as described above, the apparatus to be controlled can fail to receive a control signal with a high possibility in the environment where there are a large amount of fluorescent light of a fluorescent lamp or other disturbance light. In this case, as described above, the operator of the remote controller misbelieves that the remote controller or the apparatus to be controlled has failed since the apparatus to be controlled does not operate in response to the depression of the key, or misbelieves that an intended key switch for the remote controller has not yet been turned on, and therefore, should continuously depress the key with an excessive force. Therefore, the remote controller is not easy to use.

Further, in the case of the remote controller which repeatedly transmits the same control signal during the depression of a key, if the reception of a control signal is interrupted by an obstacle or the like during the depression of a key, and then the obstacle or the like is removed to receive the next control signal, the apparatus to be controlled determines that the key has been released once and then depressed again, and hence numeric values indicative of times or the like are redundantly set.

SUMMARY OF THE INVENTION

It is a first object of the present invention to provide a remote controller system, a remote controller apparatus, and a remote controller method, which can reliably provide desired control while saving power, as well as to a program for implementing the method and an electronic apparatus which is remotely controlled.

It is a second object of the present invention to provide a remote controller system, a remote controller apparatus, and a remote controller method, which can reliably provide desired control even if the electronic apparatus has failed to receive part of a control signal which is repeatedly transmitted during the depression of a key, as well as to a program for implementing the method and an electronic apparatus which is remotely controlled.

To attain the first object, in a first aspect of the present invention, there is provided a remote control system comprising a remote control apparatus; and a first apparatus controlled by the remote control apparatus, and the remote control apparatus comprises at least one key switch for remote control, and a first transmitting device that repeatedly transmits a control signal corresponding to the key switch while the key switch is being operated and that inhibits the transmission of the control signal in accordance with reception of a predetermined signal from the first apparatus.

According to the first aspect of the present invention, it is possible to reliably provide desired control while saving power.

Preferably, the remote control apparatus and the first apparatus communicate with each other by means of infrared light.

Preferably, the first apparatus comprises a first determination device that determines whether the control signal, transmitted by the first transmitting device, is suitable for repeated control, and a second transmitting device that transmits an inhibition instruction signal for inhibiting the first transmitting device from repeatedly transmitting the control signal in accordance with a determination by the first determination device.

Preferably, the first apparatus comprises a second determination device that determines whether the control signal transmitted by the first transmitting device has been normally received, and the second transmitting device transmits the inhibition instruction signal and an acknowledgement signal indicative of normal reception of the control signal when the second determination device determines that the control signal has been normally received, and the first determination device determines that the control signal is unsuitable for repeated control.

Preferably, the remote control apparatus comprises a first determination device that determines whether the control signal corresponding to the key switch, transmitted by the first transmitting device, is suitable for repeated control, and a second determination device that determines whether a response to the control signal has been received from the first apparatus, and the transmission device is operable to inhibit repeated transmission of the control signal when the first determination device determines that the control signal is unsuitable for repeated control, and the second determination device determines that the response has been received.

To attain the first object, in a second aspect of the present invention, there is provided a remote control apparatus that remotely controls a first apparatus, comprising at least one key switch for remote control, a transmitting device that repeatedly transmits a control signal corresponding to the key switch while the key switch is being operated, and an inhibition device that inhibits the transmitting device from repeatedly transmitting the control signal in accordance with reception of a predetermined signal from the first apparatus.

To attain the first object, in a third aspect of the present invention, there is provided an electronic apparatus that is remotely controlled by a remote control apparatus, comprising a first determination device that determines whether a same control signal repeatedly transmitted by the remote control apparatus is suitable for repeated control, and a transmitting device that transmits an inhibition instruction signal for inhibiting the repeatedly transmission of the control signal in accordance with a determination by the first determination device.

Preferably, the electronic apparatus further comprises a second determination device that determines whether the control signal has been normally received, and the transmitting device transmits the inhibition instruction signal and an acknowledgement signal indicative of normal reception of the control signal when the second determination device determines that the control signal has been normally received, and the first determination device determines that the control signal is unsuitable for repeated control.

To attain the first object, in a fourth aspect of the present invention, there is provided a remote control method of remotely controlling a first apparatus by a remote control apparatus, comprising a transmitting step of repeatedly transmitting a control signal corresponding to a key switch for remote control while the key switch is being operated, and an inhibiting step of inhibiting repeated transmission of the control signal in accordance with reception of a predetermined signal from the first apparatus.

To attain the first object, in a fifth aspect of the present invention, there is provided a remote control method of remotely controlled by a remote control apparatus, comprising a first determination step of determining whether a same control signal repeatedly transmitted by the remote control apparatus is suitable for repeated control, and a transmitting step of transmitting an inhibition instruction signal for inhibiting the repeatedly transmission of the control signal in accordance with a determination in the first determination step.

To attain the first object, in a sixth aspect of the present invention, there is provided a program for causing a computer to execute a remote control method of remotely controlling a first apparatus by a remote control apparatus, comprising a transmitting module for repeatedly transmitting a control signal corresponding to a key switch for remote control while the key switch is being operated, and an inhibiting module for inhibiting repeated transmission of the control signal in accordance with reception of a predetermined signal from the first apparatus.

To attain the first object, in a seventh aspect of the present invention, there is provided a program for causing a computer to execute a remote control method of remotely controlled by a remote control apparatus, comprising a first determination module for determining whether a same control signal repeatedly transmitted by the remote control apparatus is suitable for repeated control, and a transmitting module for transmitting an inhibition instruction signal for inhibiting the repeatedly transmission of the control signal in accordance with a determination in the first determination module.

To attain the first object, in an eighth aspect of the present invention, there is provided a remote control system comprising a remote control apparatus, and a first apparatus controlled by the remote control apparatus, and the first apparatus comprises a first determination device that determines whether a control signal has been normally received from the remote control apparatus, and a returning device that returns an acknowledgement signal indicative of normal reception of the control signal when the determination device determines that the control signal has been normally received, and the remote control apparatus comprises at least one key switch for remote control, a transmitting device that repeatedly transmits a control signal corresponding to the key switch while the key switch is being operated, a second determination device that determines whether the control signal corresponding to the key switch is suitable for repeated control when the acknowledgement signal is returned from the apparatus to be controlled, and an inhibition device that inhibits the transmitting device from repeatedly transmitting the control signal when the second determination device determines that the control signal corresponding to the key switch is unsuitable for repeated control.

To attain the first object, in a ninth aspect of the present invention, there is provided a remote control apparatus that remotely controls a first apparatus, comprising at least one key switch for remote control, a transmitting device that repeatedly transmits a control signal corresponding to the key switch while the key switch is being operated, a determination device that determines whether the control signal is suitable for repeated control when an acknowledgement signal indicative of normal reception of the control signal is returned from the apparatus to be controlled in response to the control signal, and an inhibition device that inhibits the transmitting device from repeatedly transmitting the control signal when the determination device determines that the control signal is unsuitable for repeated control.

To attain the first object, in a tenth aspect of the present invention, there is provided a remote control method of remotely controlling a first apparatus by a remote control apparatus, comprising a transmitting step of repeatedly transmitting a control signal corresponding to a key switch for remote control while the key switch is being operated, a determination step of determining whether the control signal is suitable for repeated control when an acknowledgement signal indicative of normal reception of the control signal is returned from the apparatus to be controlled in response to the control signal, and an inhibiting step of inhibiting repeated transmission of the control signal when it is determined in the determination step that the control signal is unsuitable for repeated control.

To attain the first object, in an eleventh aspect of the present invention, there is provided a program for causing a computer to execute a remote control method of remotely controlling a first apparatus by a remote control apparatus, comprising a transmitting module for repeatedly transmitting a control signal corresponding to a key switch for remote control while the key switch is being operated, a determination module for determining whether the control signal is suitable for repeated control when an acknowledgement signal indicative of normal reception of the control signal is returned from the apparatus to be controlled in response to the control signal, and an inhibiting module for inhibiting repeated transmission of the control signal when it is determined by the determination module that the control signal is unsuitable for repeated control.

To attain the second object, in a twelfth aspect of the present invention, there is provided a remote control system comprising a remote control apparatus, and a first apparatus to be controlled by the remote control apparatus, and the remote control apparatus comprises at least one key switch for remote control, and a transmitting device that repeatedly transmits a control signal corresponding to the key switch while the key switch is being operated, and the transmitting device adds a discrimination information for discriminating the control signal transmitted for a first time by the transmitting device, and the control signal transmitted for a second or subsequent time by the transmitting device, to the control signal.

According to the twelfth aspect of the present invention, it is possible to reliably provide desired control even if the electronic apparatus has failed to receive part of a control signal which is repeatedly transmitted during the depression of a key.

Preferably, the transmitting device transmits the control signal by means of infrared light.

Preferably, the transmitting device adds a packet number as the discrimination information.

More preferably, the transmitting device adds a predetermined packet number as the discrimination information to the control signal transmitted for the first time, and cyclically selects and adds one from among a plurality of packet numbers, different from the packet number added to the control signal transmitted for the first time, to the control signal transmitted for the second or subsequent time.

More preferably, the transmitting device adds a predetermined packet number as the discrimination information to the control signal transmitted for the first time, and adds a predetermined packet number different from the packet number added to the control signal transmitted for the first time, to the control signal transmitted for the second or subsequent time.

Further preferably, the transmitting device adds a predetermined leader code as the discrimination information to a leading end of the control signal transmitted for the first time, and adds a predetermined leader code different from the leader code added to the control signal transmitted for the first time, to a leading end of the control signal transmitted for the second or subsequent time.

Further preferably, the transmitting device adds a predetermined end code as the discrimination information to a trailing end of the control signal transmitted for the first time, and adds a predetermined end code different from the end code added to the control signal transmitted for the first time, to a trailing end of the control signal transmitted for the second or subsequent time.

To attain the second object, in an thirteenth aspect of the present invention, there is provided a remote control apparatus that wirelessly and remotely controls a first apparatus, comprising at least one key switch for remote control, and a transmitting device that repeatedly transmits a control signal corresponding to the key switch while the key switch is being operated, and the transmitting device adds a discrimination information for discriminating the control signal transmitted for a first time by the transmitting device, and the control signal transmitted for a second or subsequent time by the transmitting device, to the control signal.

To attain the second object, in a fourteenth aspect of the present invention, there is provided a remote control method of wirelessly and remotely controlling a first apparatus, comprising a transmitting step of repeatedly transmitting a control signal corresponding to a key switch for remote control while the key switch is being operated, and an addition step of adding a discrimination information for discriminating the control signal transmitted for a first time and the control signal transmitted for a second or subsequent time to the control signal.

To attain the second object, in a fifteenth aspect of the present invention, there is provided a program for causing a computer to execute a remote control method of wirelessly and remotely controlling a first apparatus, comprising a transmitting module for repeatedly transmitting a control signal corresponding to a key switch for remote control while the key switch is being operated, and an addition module for adding a discrimination information for discriminating the control signal transmitted for a first time and the control signal transmitted for a second or subsequent time to the control signal.

The above and other objects, features, and advantages of the invention will become more apparent from the following detailed description taken in conjunction with the accompanying drawings.

BRIEF DESCRIPTION OF THE DRAWINGS

FIGS. 12A and 12B are views showing examples of the driving waveform of a leader code in the control signal appearing in FIG. 11, in which FIG. 12A shows a first leader code which is used for data to be transmitted for the first time upon depression of a key, and FIG. 12B shows a second leader code which is used for data to be transmitted for the second and subsequent times during depression of a key;

FIG. 21 is a view showing an example of the structure of a conventional control signal.

DETAILED DESCRIPTION OF THE PREFERRED EMBODIMENTS

The present invention will now be described in detail with reference to the accompanying drawings showing preferred embodiments thereof.

Figure 1:
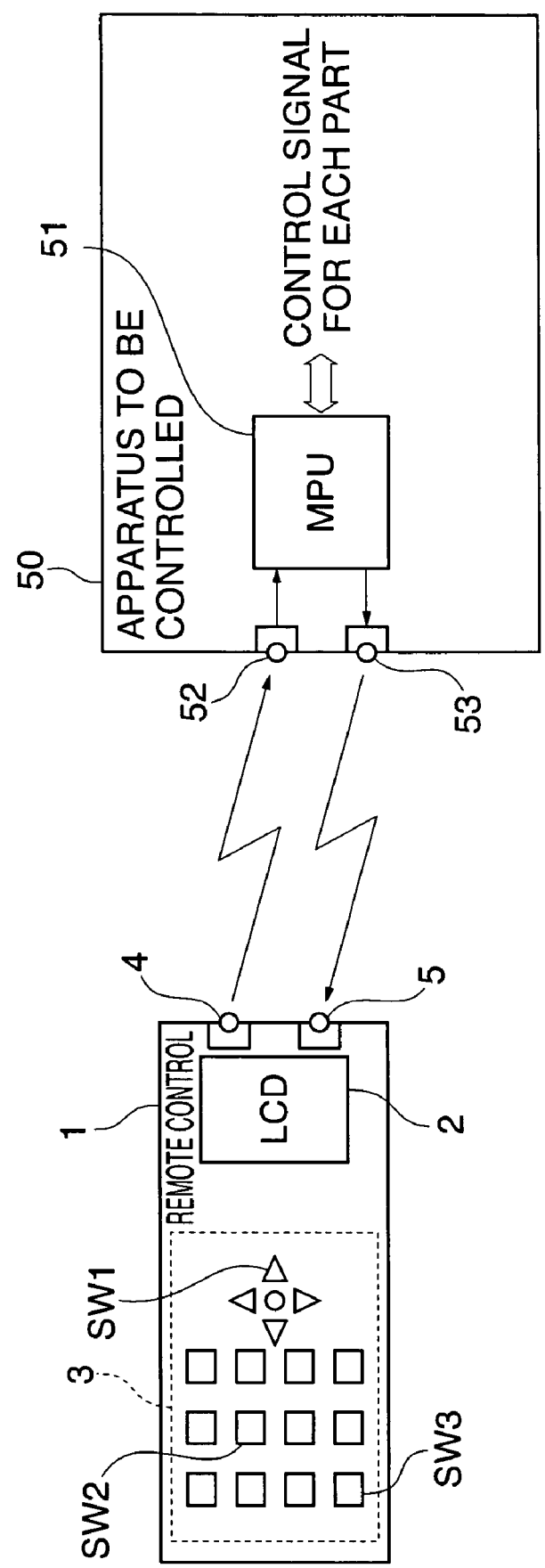
FIG. 1 is a view showing the arrangement of a remote controller system according to a first embodiment of the present invention.

FIG. 1 is a view showing the arrangement of a remote control system according to a first embodiment of the present invention. In FIG. 1, reference numeral 1 denotes a remote controller, and reference numeral 50 denotes an apparatus to be controlled.

The remote controller 1 includes a keyboard 3, a liquid crystal display 2, an infrared light emitting section (infrared light emitting diode) 4, and an infrared light receiving section (photodiode) 5. The apparatus 50 to be controlled (hereinafter referred to as the "controlled apparatus 50") includes an infrared light receiving section 52 for receiving an infrared light signal from the remote controller 1, an infrared light emitting section 53 for transmitting an infrared light signal to the remote controller 1, and a microprocessor (MPU) 51 which controls processing of the transmitted and received signals and component parts, not shown, of the controlled apparatus 50.

Figure 2:
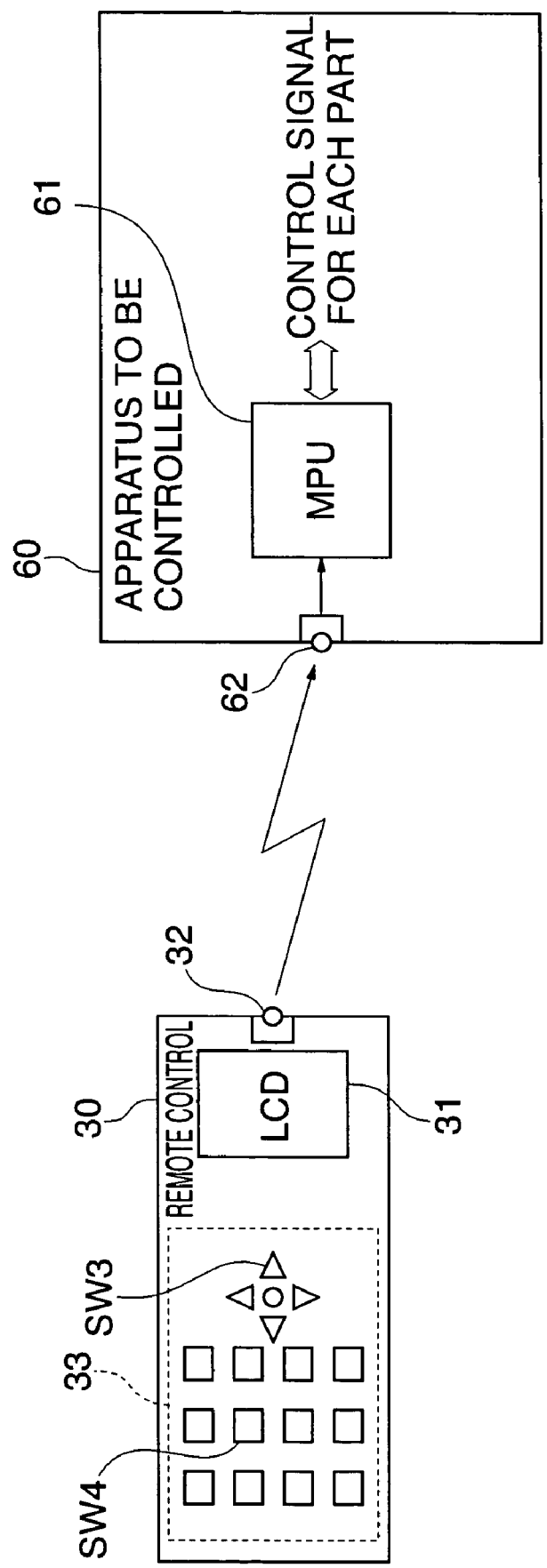
FIG. 2 is a view showing the arrangement of a conventional remote controller system.

FIG. 2 is a view showing the arrangement of a conventional remote control system. In FIG. 2, reference numeral 30 denotes a remote controller, and reference numeral 60 denotes an apparatus to be controlled.

The remote controller 30 includes a keyboard 33, a liquid crystal display 31, and an infrared emitting section (infrared emitting diode) 32. The apparatus 60 to be controlled (hereinafter referred to as the "controlled apparatus 60") includes an infrared light receiving section 62 for receiving an infrared light signal from the remote controller 1, and a microprocessor (MPU) 61 which controls processing of the received signal and component parts, not shown, of the controlled apparatus 60.

Namely, the remote control system according to the present invention carries out two-way signal transmission, not one-way signal transmission as in the prior art.

Figure 3:
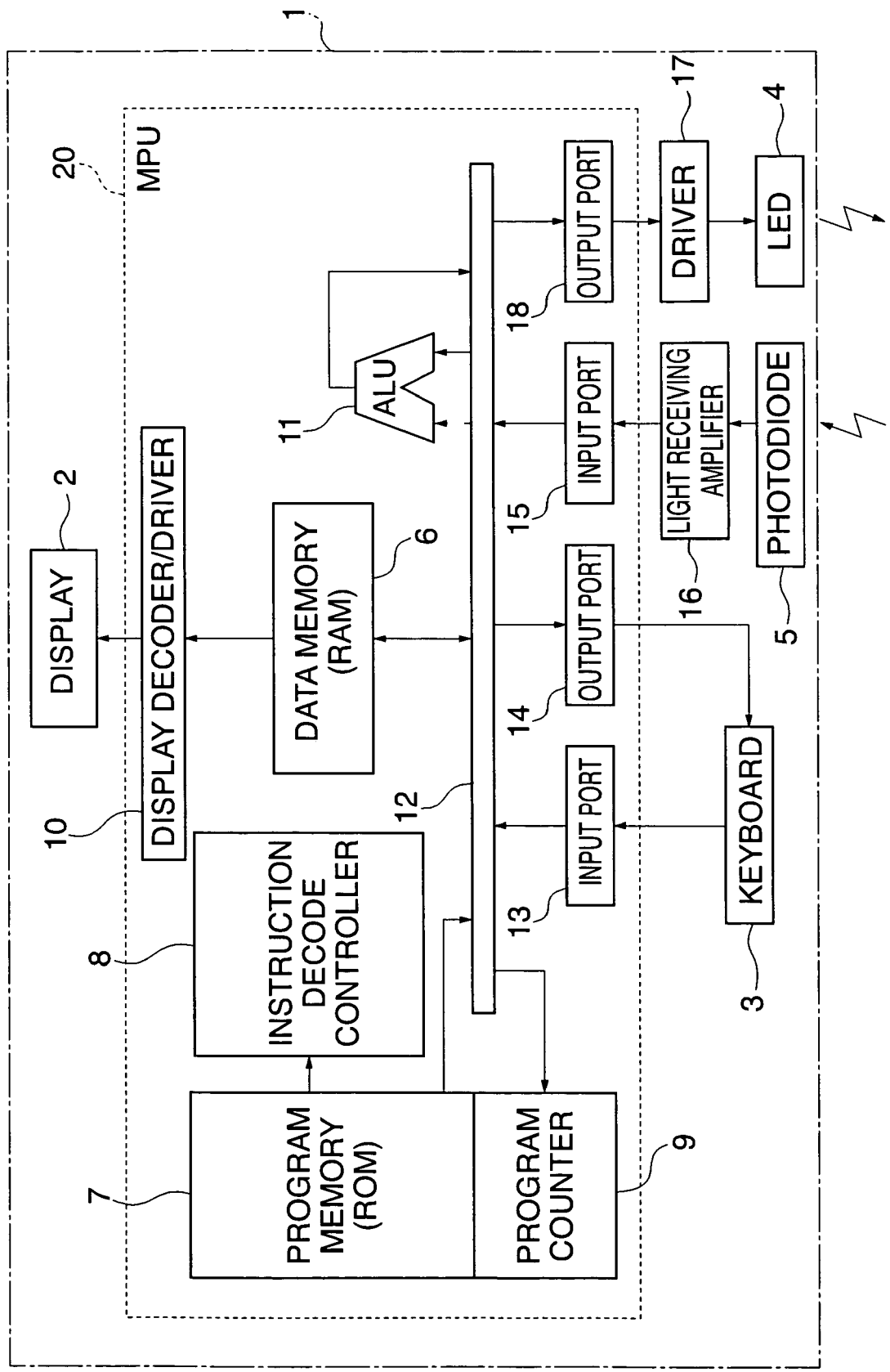
FIG. 3 is a block diagram schematically showing the construction of a remote controller appearing in FIG. 1.

FIG. 3 is a block diagram schematically showing the construction of the remote controller 1 appearing in FIG. 1.

In FIG. 3, reference numeral 20 denotes a microprocessor (MPU) including a program memory (ROM) 7 which stores programs for carrying out various kinds of processing, described later, and a program counter 9. Instructions stored at addresses designated by the program counter 9 are decoded by an instruction decode controller 8 to control component parts in synchronism with a predetermined timing clock, not shown.

For example, data stored in a data memory 6 implemented by a RAM is transmitted to an arithmetic-logic unit (ALU) 11 via a data bus 12 to cause the same to perform arithmetic processing, and the arithmetic processing result is stored in the data memory 6 via the data bus 12, or the data stored in the data memory 6 is transmitted to a display decoder/driver 10 and displayed on the liquid crystal display 2.

Further, a key scan signal is output to the keyboard 3 via an output port 14 to cause the same to carry out keyscanning, and if any key on the keyboard 3 has been depressed, a key operation signal corresponding to the depressed key is captured via an input port 13 and stored in the data memory 6 via the data bus 12, so that processing suitable for each key (exactly, a key switch) is performed in accordance with a program stored in the program memory 7.

Further, signal data for controlling the apparatus, which is stored in the data memory 6, is transmitted to an output port 18, and a driver 17 drives the infrared emitting diode 4 to convert the signal data into an infrared light signal and transmits the same to the controlled apparatus 50.

Further, a response signal or the like of infrared light from the controlled apparatus 50 is received by the photodiode 5, and captured into an input port 15 via a light receiving amplifier 16, so that the response signal or the like is stored in the data memory 6 via the bus 12 and displayed on the liquid crystal display 2, or various kinds of operation control are provided.

Next, a description will be given of a control signal transmitting process according to the present embodiment with reference to a flow chart of FIG. 4.

In a step S1, display processing is carried out, in which data to be displayed is selected from data in the data memory 6 appearing in FIG. 3 and is displayed. Next, it is determined whether there has been a key input or not (step S2), and if there has been no key input, the process returns to the step S1, so that the steps S1 and S2 are executed again.

Figure 5:
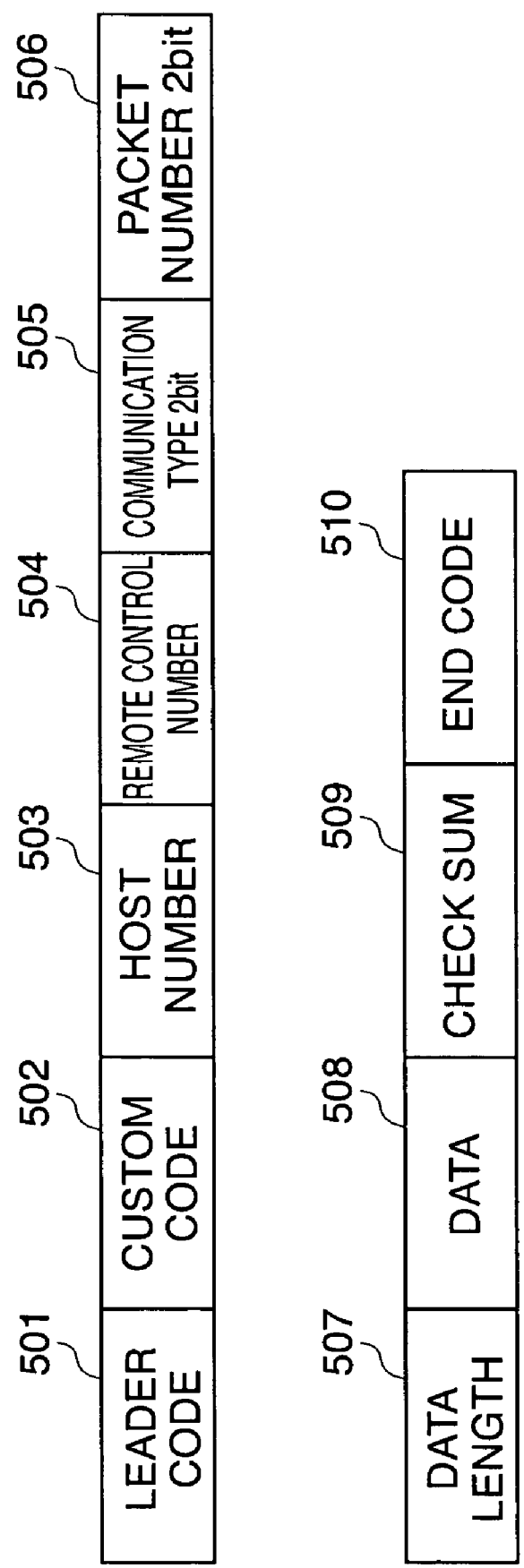
FIG. 5 is a view showing an example of the structure of a control signal according to the first embodiment.

If there has been a key input, the process proceeds to a step S3 wherein a light signal as a control signal corresponding to the key input is transmitted. Referring to FIG. 5, a description will be now given of the code system of one frame of the light signal.

FIG. 5 is a view showing an example of the structure of a control signal according to the present embodiment.

In FIG. 5, reference numeral 501 denotes a leader code, and reference numeral 502 denotes a custom code. They are identical with those of the above described prior art, and description thereof is therefore omitted.

Reference numeral 503 denotes a code which designates one of a plurality of controlled apparatuses 50, as an object to be controlled, and a host number for identifying the designated controlled apparatus 50 is set as the code 503. Different host numbers are assigned to a plurality of controlled apparatuses 50, and hence even if they are of the same manufacturer and the same model, it is possible to selectively control one among them.

Reference numeral 504 denotes a code for enabling any one controlled apparatus 50 to receive a control signal via a selected one of a plurality of remote controllers of the same manufacturer, and a remote control number assigned to the selected remote controller is set as the code 504.

Reference numeral 505 denotes a communication type code which is indicative of whether data to be transmitted is comprised of one frame (referred to as a single frame) or a plurality of frames (referred to as multi frames), and a code "00" is set for a single frame. If data to be transmitted is comprised of multi frames, a number "01" is set for the first frame, a number "10" is set for intermediate frames, and a number "11" is set for the last frame, so that the code 505 as well as a packet number, described later, can be used for managing the properties of respective frames.

Reference numeral 506 denotes a code indicative of a packet number, and is comprised of 2 bits indicative of the order of data to be transmitted (command).

If data to be transmitted is single-frame data, a code "00" is assigned as the packet number 506 to the first single frame. Three codes "01", "10", and "11" other than the code "00" are cyclically assigned in the order of "01"→"10"→"11"→"01"→"10" to the second and subsequent single frames which are repeatedly transmitted during continuous depression of a key, so that the first single frame (command) and the second and subsequent single frames (commands) can be discriminated from each other. It should be noted that one or two of the codes "01", "10", and "11" may be fixedly assigned to the second and subsequent single frames.

On the other hand, if data to be transmitted is multi-frame data, the codes "00", "01", "10", and "11" are cyclically assigned in the order of "00"→"01"→"10"→"11"→"00"→01" as the packet number 506 to multiple frames simply as in the case of a quaternary counter. This is because in remote control, the order of data to be transmitted is never changed as is distinct from packet data flowing on a signal line of a LAN (Local Area Network) or the like, and hence each frame among multiple frames can be identified even if a small number of numeric values are repeated.

Reference numeral 507 denotes data length information indicative of the length of data (command); 508, data (command); 509, a check sum; and 510, an END code.

Figure 4:
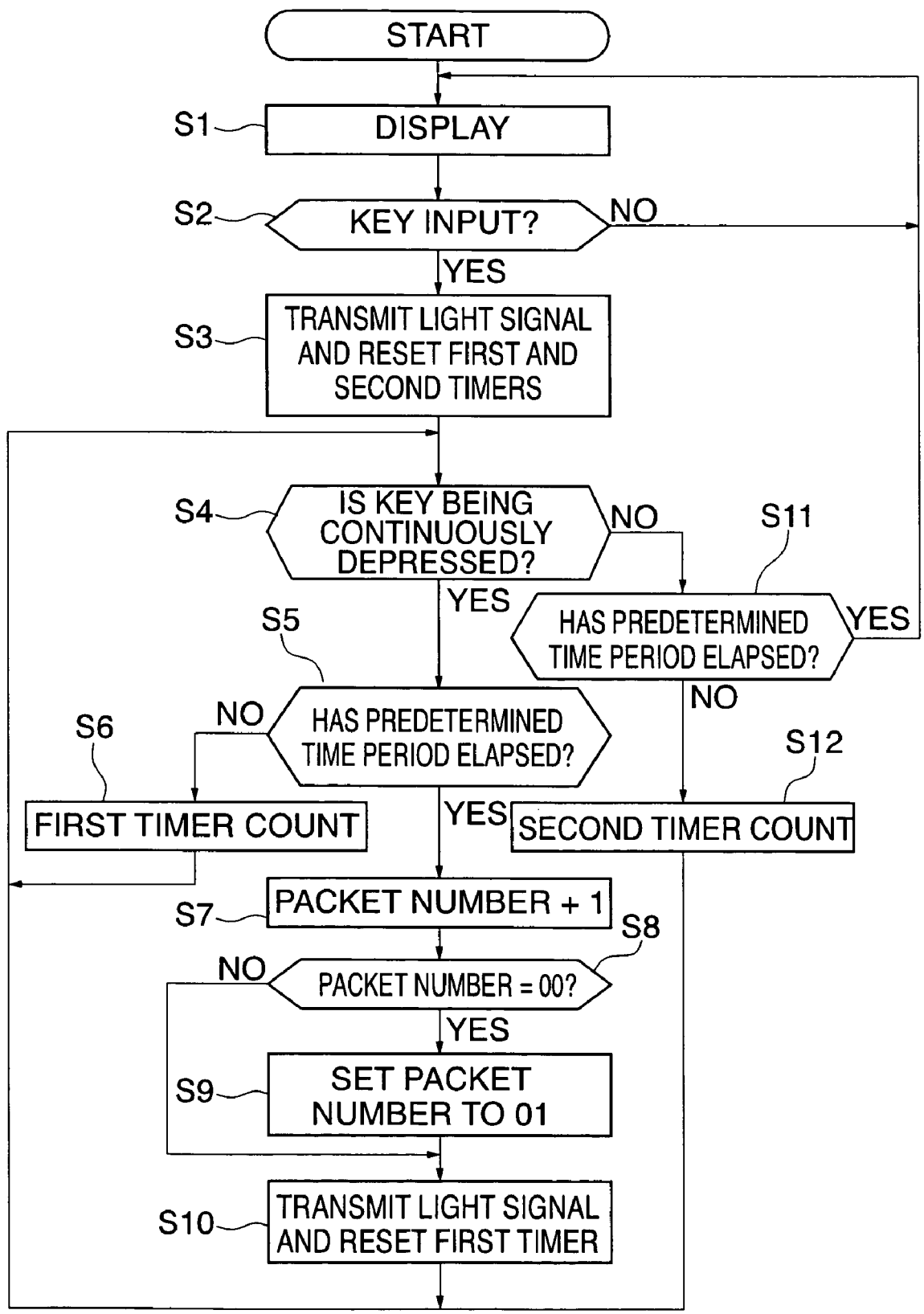
FIG. 4 is a flow chart showing a control signal transmitting process according to the first embodiment.

In a step S3 in FIG. 4, the light signal in the format as described above is transmitted, and the count values of a first timer and a second timer, not shown, provided on the data memory 6 are reset.

Then, it is determined whether or not the key is being continuously depressed (step S4). If the key is being continuously depressed, the process proceeds to a step S5 wherein a determination as to whether a predetermined period of time has elapsed or not is made by determining whether the count value of the first timer has become equal to a predetermined value or not. If the predetermined period of time has not elapsed, the count value of the first timer is incremented by one (step S6), and the process returns to the step S4.

On the other hand, if the predetermined period of time has elapsed, the process proceeds to a step S7 wherein 1 is added to the value of the 2-bit packet number 506. Then, it is determined in a step S8 whether the resulting 2-bit value is "00" or not. If the resulting value is "00", the packet number 506 is set to "01" in a step S9, and a light signal is transmitted and the first timer is reset in a step S10. The process then returns to the step S4.

On the other hand, if the resulting packet number is not "00", the process proceeds to the step S10 with the step S9 being skipped, so that a light signal is transmitted while the 2-bit packet number obtained by addition in the step S7 is maintained, and the first timer is reset.

As a result of the processing described above, while the key is being depressed, the packet number is cyclically changed to "01", "10", "11", and "01", and light signals are sequentially transmitted at predetermined time intervals.

If it is determined in the step S4 that the key is not continuously depressed or the key is released, a determination as to whether a predetermined period of time has elapsed or not is made by determining whether the count value of the second timer has become equal to a predetermined value or not so as to determine whether the key has been released for the predetermined period of time or not, i.e. whether the key has-been surely released or not (step S11). If the predetermined period of time has not elapsed, the count value of the second timer is incremented by one (step S12), and the process returns to the step S4. On the other hand, if the count value of the second timer has become equal to the predetermined value, i.e. the predetermined period of time has elapsed, it is determined that the key has been surely released, and the process returns to the step S1.

A description will now be given of differences between the present embodiment and the prior art with reference to FIGS. 6 and 7.

Figure 6:
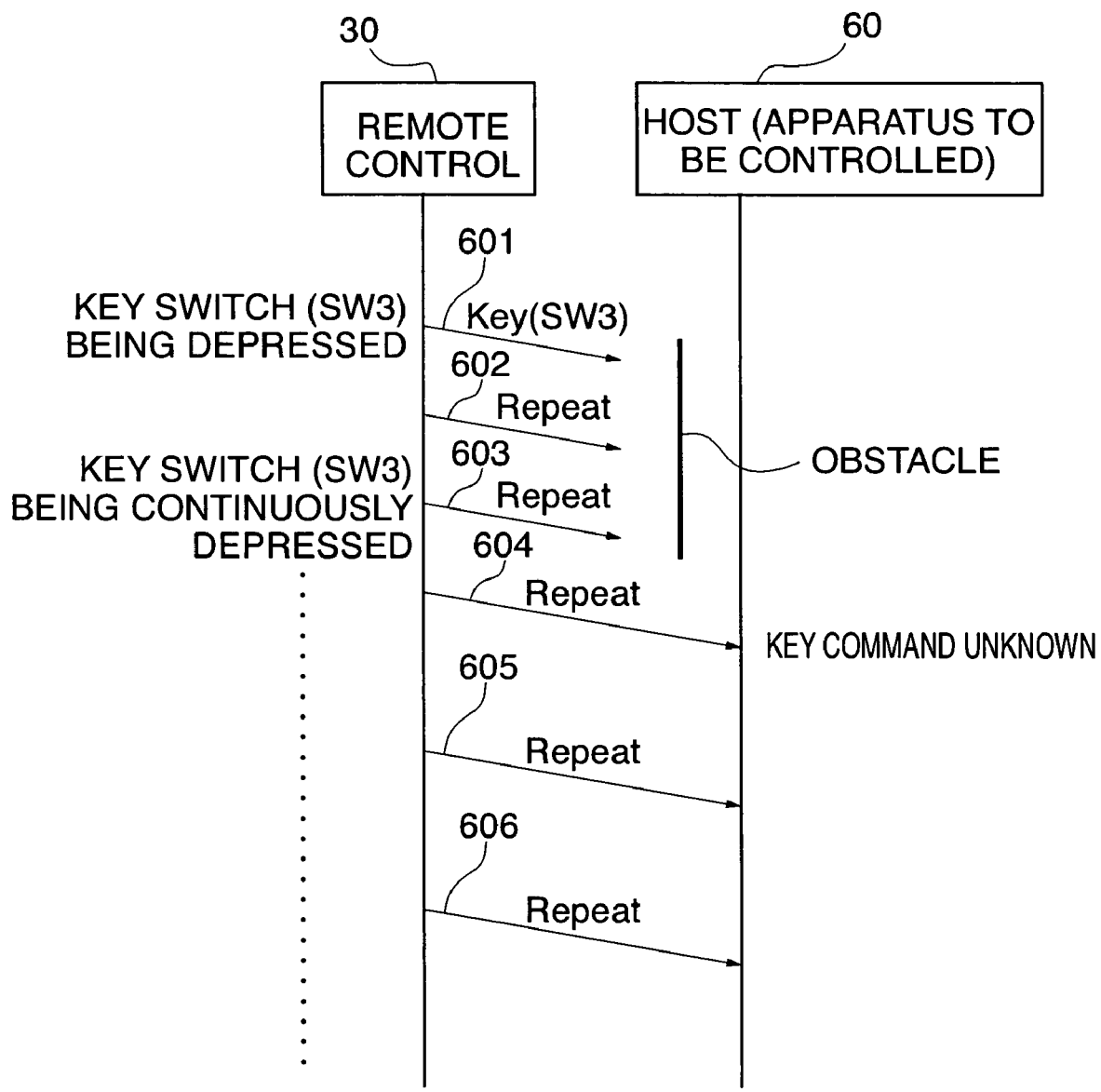
FIG. 6 is a view schematically showing a procedure for carrying out transmission between the conventional remote controller and an apparatus to be controlled (in the case where a repeat signal is transmitted during the depression of a key, and the signal is light-shielded from the beginning)

FIG. 6 is a view schematically showing a procedure for carrying out communication between the remote controller 30 which repeatedly transmits a repeat signal while a key switch is continuously depressed and the controlled apparatus 60 according to the prior art. When an arbitrary key switch SW3 of the remote controller 30 (refer to FIG. 2) is depressed, an infrared light signal 601 with a format in FIG. 21A is transmitted.

However, if the infrared light signal 601 is not received by the controlled apparatus 60 due to the presence of an obstacle or the like or the direction in which the remote controller 30 is placed, the next signal 602 which is transmitted upon continuous depression of the key switch SW3 is a repeat signal with a format in FIG. 21C, and thus, a repeat signal 604 is received first by the controlled apparatus 60 after the cause of impossibility to receive a signal is eliminated. Therefore, the controlled apparatus 60 cannot recognize what kind of instructed operation should be repeated, and hence makes the repeat signals. 604, 605, and 606 through.

Figure 7:
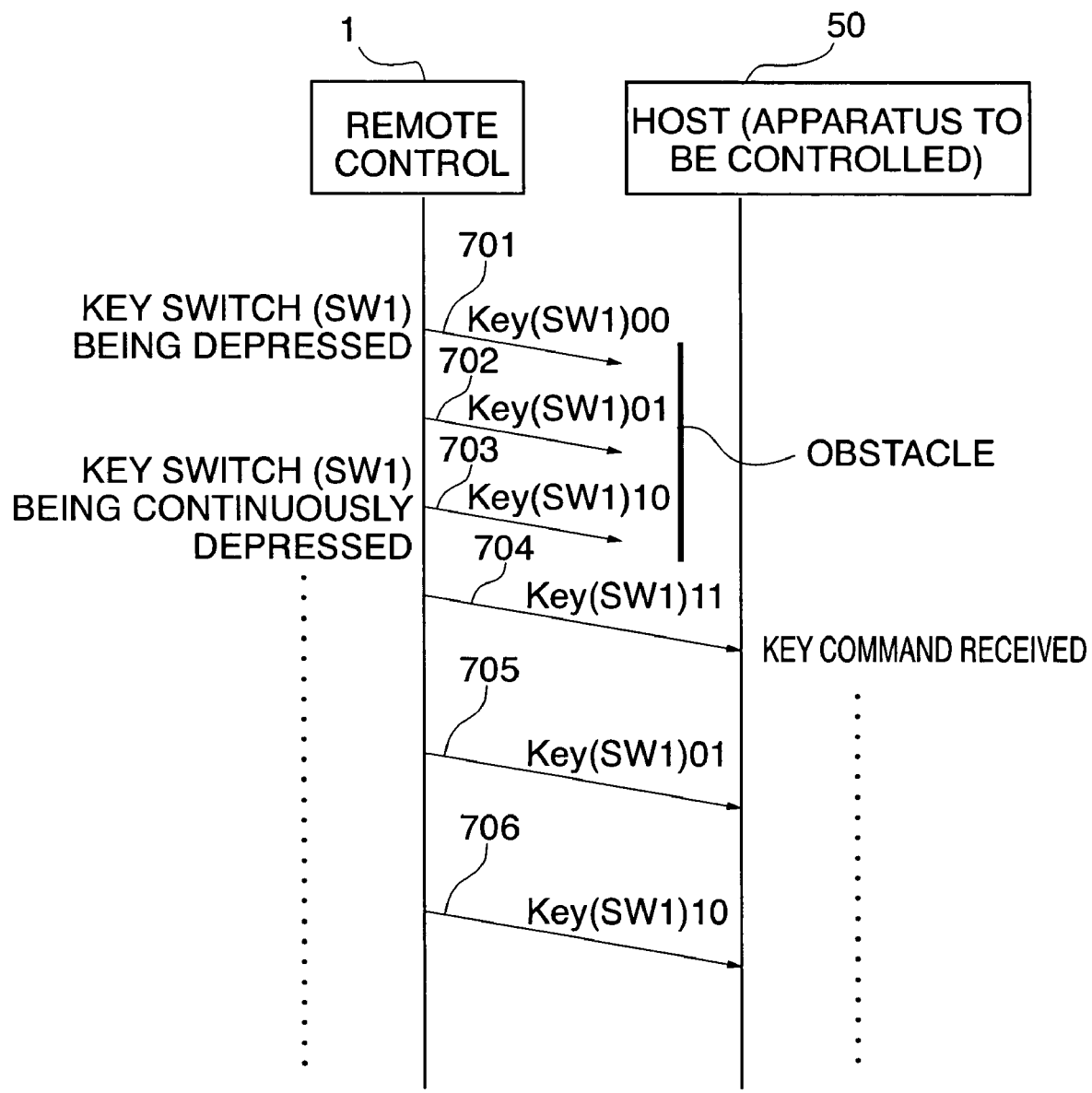
FIG. 7 is a view schematically showing a procedure for carrying out transmission between the remote controller appearing in FIG. 1 and an apparatus to be controlled (in the case where a signal is light-shielded from the beginning)

FIG. 7 is a view schematically showing a procedure for carrying out communication between the remote controller 1 and the controlled apparatus 50 according to the present embodiment. When an arbitrary key switch SW1 of the remote controller 1 (refer to FIG. 1) is depressed, an infrared light signal 701 with a format in FIG. 5 is transmitted.

However, if the infrared light signal 701 is not received by the controlled apparatus 50 due to the presence of an obstacle or the like or the direction in which the remote controller 30 is placed, the next signal 702 which is transmitted upon continuous depression of the key switch SW3 is a light signal with the same format as the signal 701 and the packet number 506 having-being changed to "01".

However, if neither the light signal 702 nor a subsequently transmitted light signal 703 is not received by the controlled apparatus 50 and a light signal 704 is received first by the controlled apparatus 50, the light signal 704 has the same format as the light signal 701 and the packet number 506 having been changed to "11".

The light signal 704 includes the host number 503, the number of a remote controller as a transmission source, the data 508 as command information indicated by the key switch SW1, and so forth, and hence the controlled apparatus 50 can recognize which remote controller has transmitted what command, and then provide suitable control.

Thereafter, if the key switch SW1 is continuously depressed, the remote controller 1 transmits light signals 705 and 706 with the same format as the light signal 701 and the packet numbers 506 having been changed to "01" and "10" at predetermined time intervals, and the controlled apparatus 50 carries out so-called a repeating operation.

In this way, the present embodiment can solve the problem of the prior art that if the apparatus to be controlled fails to receive the first signal, it cannot recognize what kind of instructed operation should be repeated.

Figure 8:
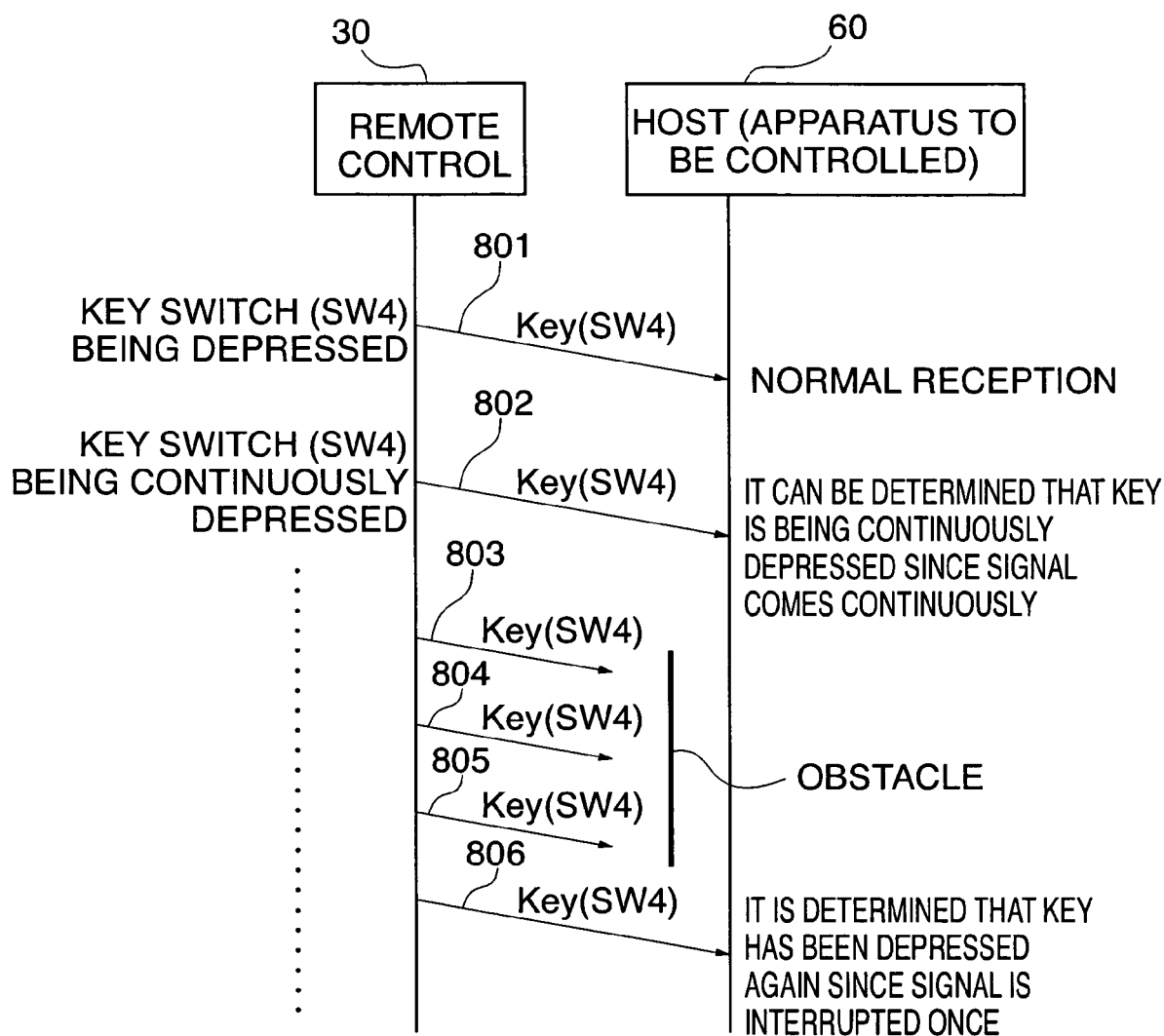
FIG. 8 is a view schematically showing a procedure for carrying out transmission between the conventional remote controller and an apparatus to be controlled (in the case where the same signal is transmitted during the depression of a key, and the signal is light-shielded in the middle of transmission)

FIG. 8 is a view schematically showing a procedure for carrying out communication between the remote controller 30 according to the prior art which transmits a light signal with a format suitable for a key switch when the key switch is continuously depressed, and the controlled apparatus 60 according to the prior art. Even if the controlled apparatus 60 fails to receive the first light signal, suitable control can be provided insofar as the Nth signal can be received since the same signal is transmitted each time, and hence the problem described above with reference to FIG. 6 does not arise.

However, if a light signal is interrupted by an obstacle during the depression of a key, another problem arises as described below.

Specifically, when an arbitrary key switch SW4 of the remote controller 30 (refer to FIG. 2) is depressed, a light signal 801 with the format in FIG. 21A is transmitted. If normally receiving the light signal 801, the controlled apparatus 60 provides control, not shown, corresponding to the key switch SW4. Since the key switch SW4 is continuously depressed, the remote controller 30 transmits a light signal 802 with the same format as the light signal 801 at predetermined time intervals.

If the received light signal 802 is a signal corresponding to repeated processing, the controlled apparatus 60 carries out suitable processing (for example, volume increase or decrease), and if the received light signal 802 is not a signal corresponding to repeated processing but a signal corresponding to e.g. channel setting, the controlled apparatus 60 carries out processing such as making the light signal 802 through.

Here, it is assumed that light signals 803, 804, 805, and 806 are transmitted due to continuous depression of the key switch SW4, but the light signals 803, 804, and 805 are not received by the controlled apparatus 60 due to an obstacle or the like, and only the light signal 806 is received by the controlled apparatus 60.

In this case, since the format in FIG. 21A does not include information indicative of the relationship between sequential light signals such as a packet number, the controlled apparatus 60 regards the received light signal 806 as a light signal corresponding to a key which is depressed again after being released. Specifically, when the reception of a signal is interrupted due to an obstacle or the like during the depression of a key, it is determined that the key has been released, and then if the obstacle or the like is removed and the next signal is received, it is determined that the key has been depressed again, and as a result, the same processing is carried out as in the case where key input is made twice.

In this case, if the light signal 806 corresponds to repeated processing or channel setting, so-called overwriting is carried out for repeated processing or channel setting. If the light signal 806 is a light signal for setting a numeric value or the like such as a time which varies with time, the same processing is carried out as in the case where key input is made twice, and numeric values or the like are redundantly set.

Figure 9:
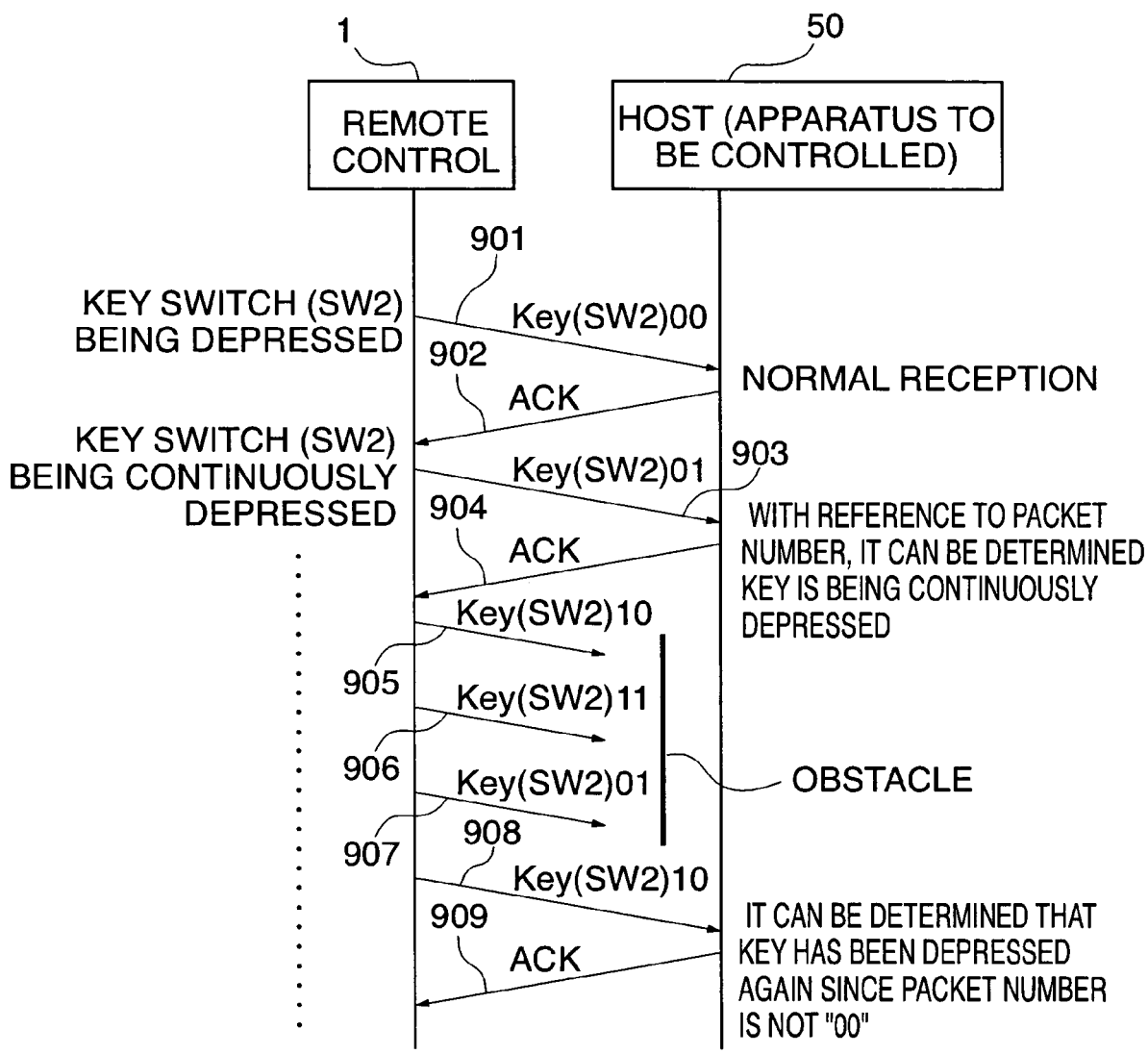
FIG. 9 is a view schematically showing a procedure for carrying out transmission between the remote controller appearing in FIG. 1 and an apparatus to be controlled (in the case where an ACK signal is returned, and signals are light-shielded in the middle of transmission)

FIG. 9 is a view schematically showing a procedure for carrying out communication between the remote controller 1 and the controlled apparatus 50 according to the present embodiment. When an arbitrary key switch SW2 of the remote controller 1 (refer to FIG. 1) is depressed, a light signal 901 with the format in FIG. 5 is transmitted. If normally receiving the light signal 901, the controlled apparatus 50 returns an ACK signal 902 which acknowledges normal reception to the remote controller 1, and provides control, not shown, corresponding to the key switch SW2.

Since the key switch SW2 is continuously depressed, the remote controller 1 transmits a light signal 903 with the same format as the light signal 901 and with the packet number 506 having been changed to "01" at predetermined time intervals. If the received light signal 903 is a signal corresponding to repeated processing, the controlled apparatus 50 carries out suitable processing (for example, volume increase or decrease) and returns an ACK signal 904, and if the received light signal 903 is not a signal corresponding to repeated processing but a signal corresponding to e.g. channel setting, the controlled apparatus 50 carries out processing such as making the light signal 903 through, and returns the ACK signal 904.

Here, it is assumed that light signals 905, 906, 907, and 908 are transmitted due to continuous depression of the key switch SW2, but the light signals 905, 906, and 907 are not received by the controlled apparatus 50 due to any obstacle or the like, and only the light signal 908 is received by the controlled apparatus 50.

In this case, the received light signal 908 is a light signal with the same format as the light signal 901 and the packet number 506 having been changed to "10", and the controlled apparatus 50 can recognize that the light signal 908 is a continued part of the interrupted signal continuing from the light signal 901. The light signal 908 includes a command corresponding to the key switch SW2 as the data 508 (refer to FIG. 5) as well as a host number, the number of a remote controller as a transmission source, and so forth.

Therefore, if the light signal 908 corresponds to repeated processing, the remote controller 1 carries out suitable processing (for example, volume increase or decrease) and returns an ACK signal 909, and if the light signal 908 does not correspond to repeated processing but corresponds to e.g. setting of an input numeric value), the remote controller 1 makes the light signal 908 through to prevent redundant setting, and returns the ACK signal 909.

It should be noted that when normally receiving a signal from the remote controller 1, the controlled apparatus 50 returns an ACK signal, but may not return an ACK signal.

A description will now be given of a second embodiment of the present invention.

In the above described first embodiment, if a key is continuously depressed, the packet number "00" is assigned to the first light signal, and the packet numbers "01", "10", "11", "01" . . . are cyclically assigned to the second and subsequent light signals, but in the second embodiment, a packet number "01" is fixedly assigned to the second and subsequent light signals although a packet number "00" is assigned to the first signal as is the case with the first embodiment.

Figure 10:
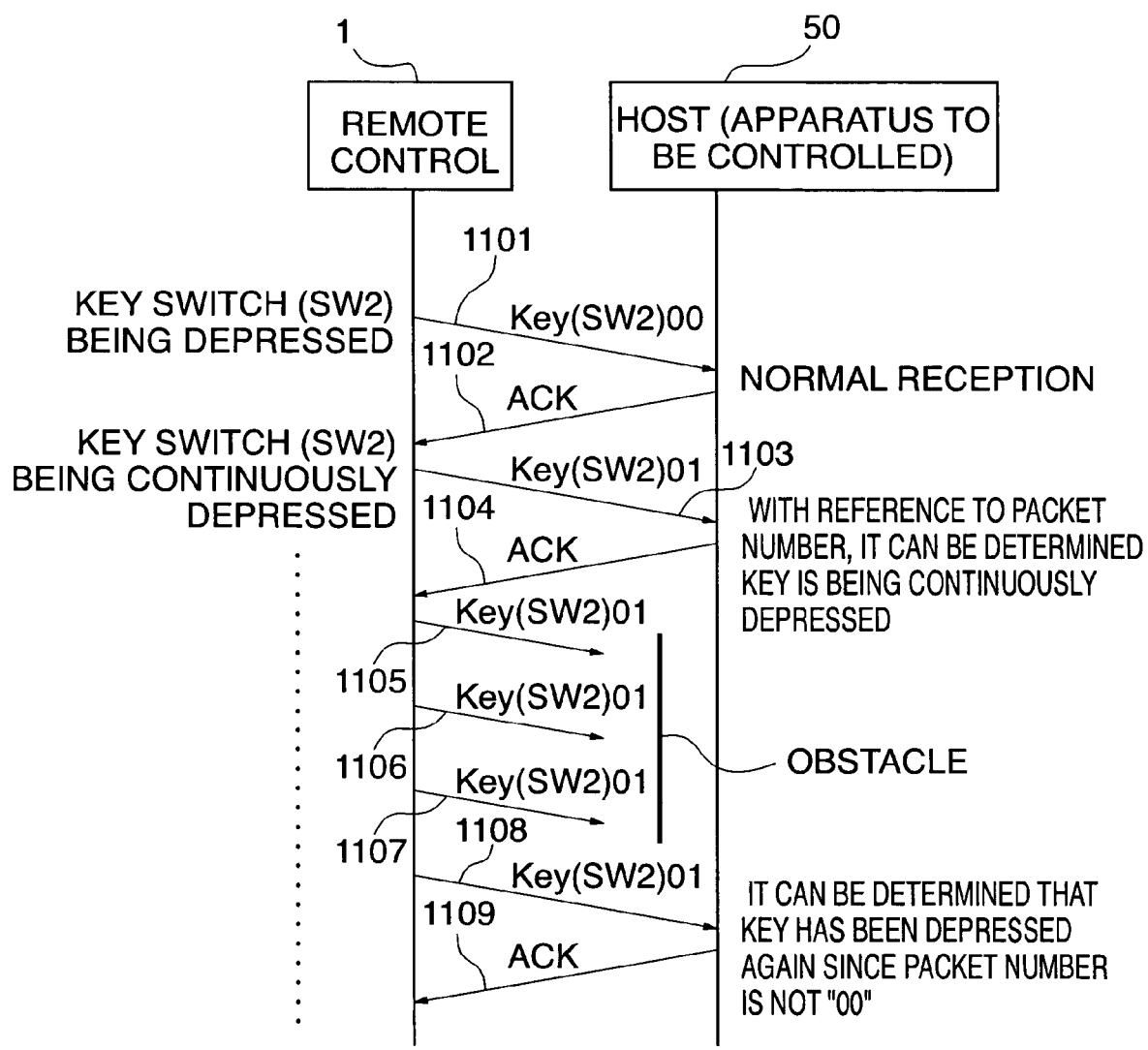
FIG. 10 is a view schematically showing a procedure for carrying out transmission between a remote controller according to a second embodiment of the present invention and an apparatus to be controlled (in the case where the packet numbers of second and subsequent control signals are fixed at "01")

FIG. 10 is a view schematically showing a procedure for carrying out communication between the remote controller 1 according to the second embodiment and the controlled apparatus 50. When an arbitrary key switch SW2 of the remote controller 1 (refer to FIG. 1) is depressed, an infrared light signal 1101 with the format in FIG. 5 is transmitted. If normally receiving the infrared light signal 1101, the controlled apparatus 50 returns a return signal ACK signal 1102 which acknowledges normal reception to the remote controller 1, and provides control, not shown, corresponding to the key switch SW2.

Since the key switch SW2 is continuously depressed, the remote controller 1 transmits a light signal 1103 with the same format as the infrared light signal 1101 and with the packet number 506 having been changed to "01" at predetermined time intervals. Thereafter, while the key switch SW2 is continuously depressed, the remote controller 1 continues to transmit the light signal 1103 with the same format as the infrared light signal 1101 and with the packet number 506 having been changed to If the continuously received light signal 1103 is a signal corresponding to repeated processing, the controlled apparatus 50 carries out suitable processing (for example, volume increase or decrease) and returns an ACK signal 1104, and if the received light signal 1103 is not a signal corresponding to repeated processing but a signal corresponding to e.g. channel setting, the controlled apparatus 50 carries out processing such as making the light signal 1103 through, and returns the ACK signal 1104.

Here, it is assumed that light signals 1105, 1106, 1107, and 1108 are transmitted due to continuous depression of the key switch SW2, but the light signals 1105, 1106, and 1107 are not received by the controlled apparatus 50 due to any obstacle or the like, and only the light signal 1108 is received by the controlled apparatus 60.

In this case, the received light signal 1108 is a light signal with the same format as the light signal 1101 and the packet number 506 having been changed to "01", and the controlled apparatus 50 can recognize that the light signal 1108 is a continued part of the interrupted signal continuing from the light signal 1101. The light signal 1108 includes a command corresponding to the key switch SW2 as the data 508 (refer to FIG. 5) as well as a host number, the number of a remote controller as a transmission source, and so forth.

Therefore, if the light signal 1108 is a signal corresponding to repeated processing, the remote controller 1 carries out suitable processing (for example, volume increase or decrease) and returns an ACK signal 1109, and if the light signal 1108 is not a signal corresponding to repeated processing but a signal corresponding to e.g. setting of an input numeric value), the remote controller 1 makes the light signal 1108 through to prevent redundant setting, and returns the ACK signal 1109.

It should be noted that in the second embodiment, when receiving a signal from the remote controller 1, the controlled apparatus 50 returns an ACK signal, but may not return an ACK signal.

A description will now be given of a third embodiment of the present invention.

Figure 11:
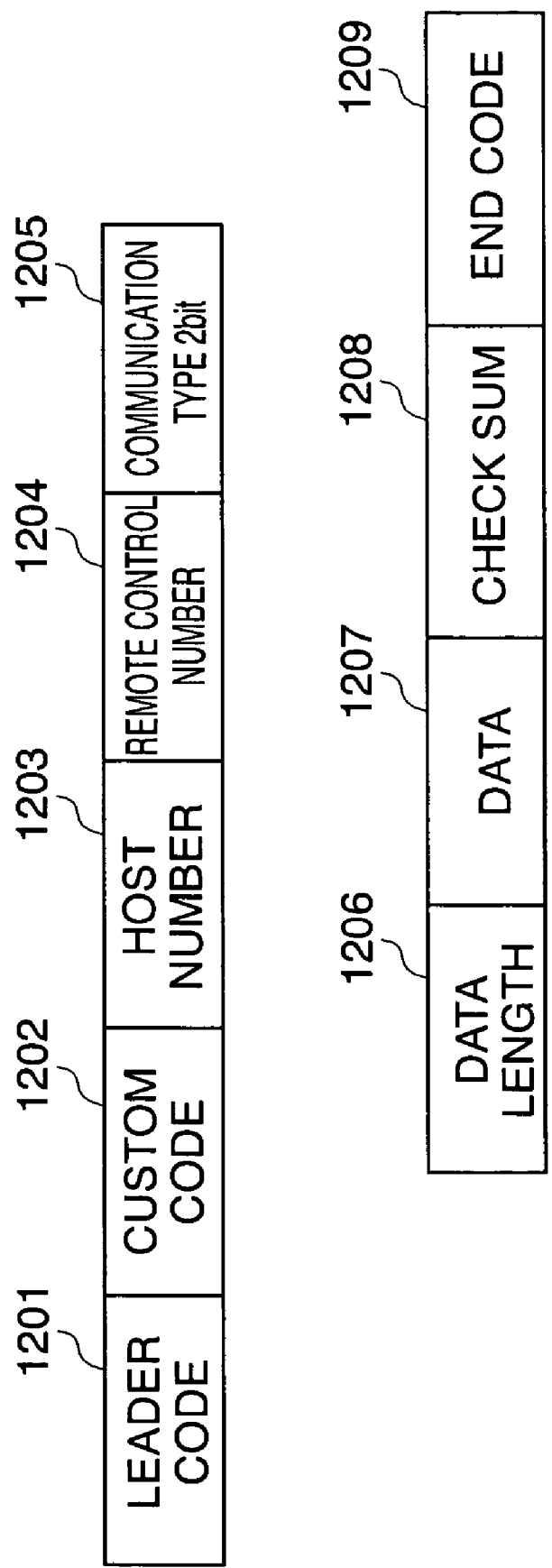
FIG. 11 is a view showing an example of the structure of a control signal according to a third embodiment of the present invention.

One frame of a light signal transmitted from the remote controller 1 is formatted as shown in FIG. 5 according to the first and second embodiments, but is formatted as shown in FIG. 11 according to the third embodiment.

In FIG. 11, reference numeral 1201 denotes a leader code; 1202, a custom code; 1203, a host number; 1204, a remote controller number; 1205, a communication type code indicative of whether data to be transmitted is comprised of one frame or a plurality of frames; 1206, a data length code indicative of the length of data (command) 1207; 1207, data (command); 1208, a check sum; and 1209, an END code.

Specifically, the frame of a light signal according to the third embodiment is configured by removing a packet number from the frame of a light signal according to the first and second embodiments.

Figure 12A:
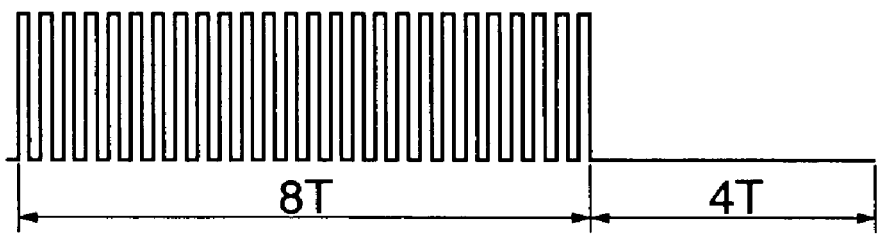
Figure 12B:
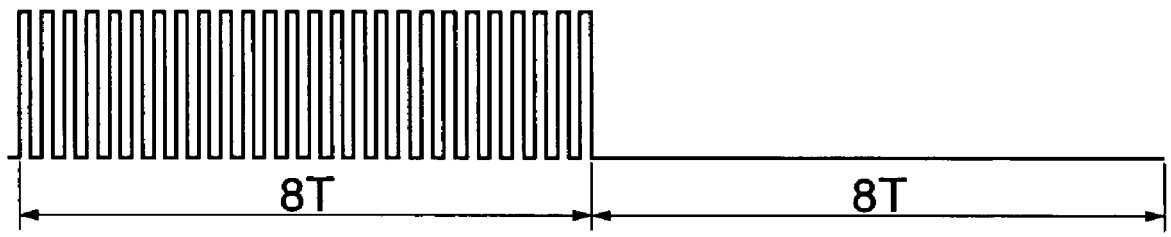

FIGS. 12A and 12B are views showing examples of the driving waveform of the leader code 1201 in FIG. 11, which are applied to the LED 4, in which FIG. 12A shows a first leader code which is used for data to be transmitted for the first time upon depression of a key, and FIG. 12B shows a second leader code which is used for data to be transmitted for the second and subsequent times during depression of a key.

The first leader code in FIG. 12A, which is used for a light signal transmitted for the first time, is identical with the one according to the first and second embodiments described with reference to FIG. 5, and is comprised of a signal present section with a duration of 8T and a signal absent section with a duration of 4T. The second leader code in FIG. 12B, which is used for light signals transmitted for the second and subsequent times, is comprised of a signal present section with a duration of 8T and a signal absent section with a duration of 8T.

As described above, in the third embodiment, different leader codes are selectively used for a light signal transmitted for the first time and for light signals transmitted subsequently, so that they have the same function as the packet number, i.e. a function of making a determination as to the continuity of signals by discriminating between a light signal transmitted for the first time and light signals transmitted subsequently.

It should be noted that the period of time required for transmission of a packet number removed in the third embodiment is "2T" for a bit "0", and is "4T" for a bit "1", and the period of time required for 2 bits varies within the range between 4T and 8T according to packet numbers.

On the other hand, the period of time required for transmission of the second leader code (16T) in FIG. 12B in a light signal transmitted for the second or subsequent time is longer only by 4T than the period of time required for transmission of the first leader code (12T) in FIG. 12A in a light signal transmitted for the first time, i.e. the period of time required for transmission of a conventional leader code. Therefore, it is possible to transmit a light signal with one frame within the same period of time or a shorter period of time as compared with the case where a light signal transmitted for the first time and light signals transmitted subsequently are discriminated from each other according to packet numbers.

It should be noted that the function of discriminating between a light signal transmitted for the first time and light signals transmitted subsequently and making a determination as to the continuity of the light signals may be realized by changing the END code.

A description will now be given of a control signal transmitting process according to the third embodiment with reference to a flow chart of FIG. 3.

Figure 13:
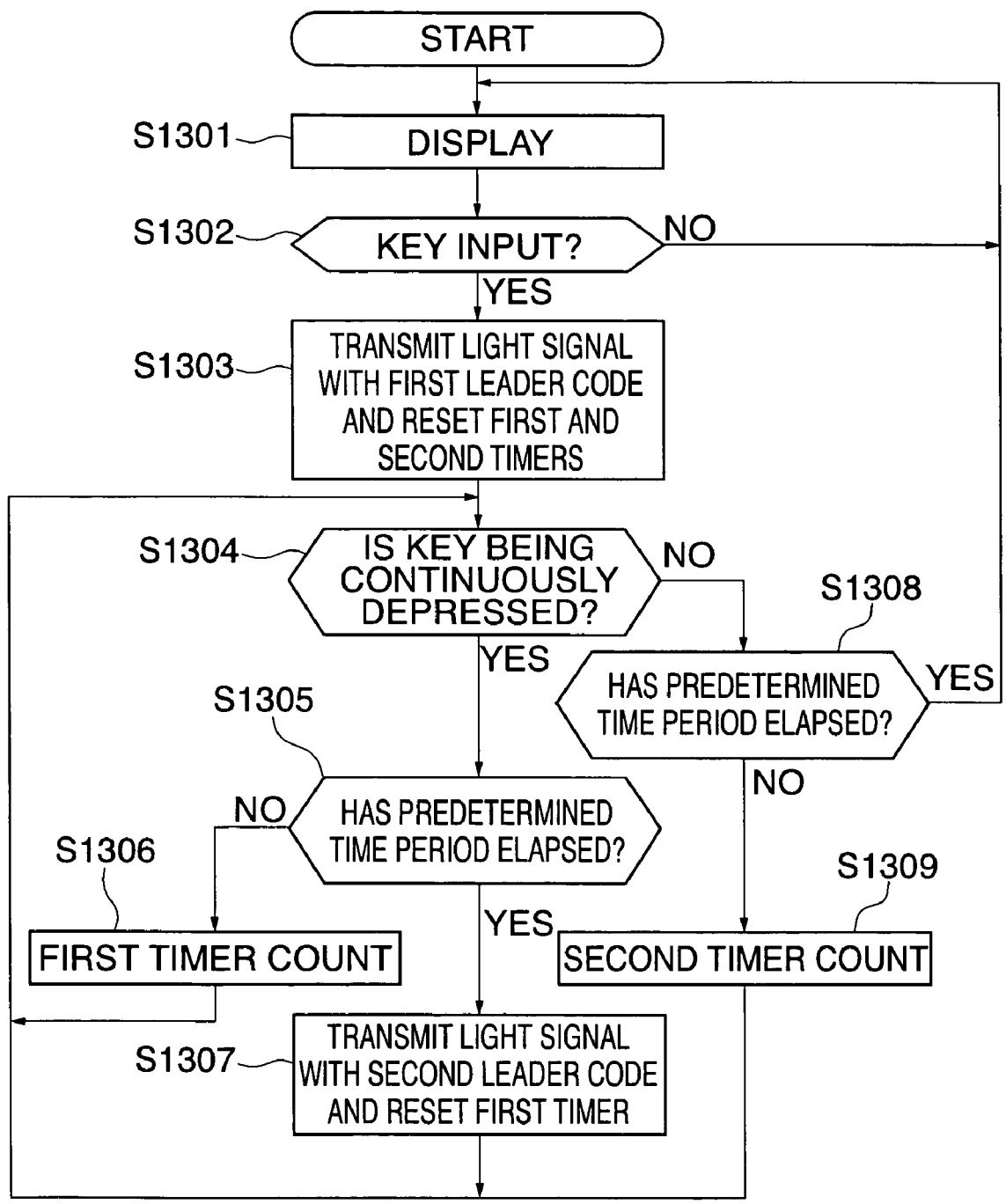
FIG. 13 is a flow chart showing a control signal transmitting process according to the third embodiment.

As shown in FIG. 13, display processing is carried out in a step S1301, in which data to be displayed is selected from data in the data memory 6 appearing in FIG. 3 and is displayed. Next, it is determined whether there has been a key input or not (step S1302), and if there has been no key input, the process returns to the step S1301, so that the steps S1301 and S1302 are executed again.

If there has been a key input, the process proceeds to a step S1303 wherein a light signal corresponding to the input key is transmitted, and the count values of the first timer and the second timer provided on the data memory 6 are reset. The first leader code in FIG. 12A is used as a leader code for the light signal transmitted in the step S1303 since it is transmitted for the first time.

Then, it is determined whether or not the corresponding key is being continuously depressed (step S1304). If the key is being continuously depressed, the process proceeds to a step S1305 wherein a determination as to whether a predetermined period of time has elapsed or not is made by determining whether the count value of the first timer has become equal to a predetermined value or not. If the predetermined period of time has not elapsed, the count value of the first timer is incremented by one (step S1306), and the process then returns to the step S1304.

On the other hand, if the predetermined period of time has elapsed, a light signal corresponding to the input key is transmitted, and the counter value of the first timer is reset (step S1307). The second leader code in FIG. 12B is used as a leader code for the light signal transmitted in the step S1307 since it is transmitted for the second or subsequent time.

Since the process thus returns from the step S1307 to the step S1304, the same light signal as the one transmitted in the step S1307 is thereafter continuously transmitted at predetermined time intervals clocked by the first timer while the key is being depressed.

If it is determined in the step S1304 that the key has been released, a determination as to whether the count value of the second timer has become equal to a predetermined value or not is determined so as to determine whether the key has been released for the predetermined period of time or not, i.e. whether the key has been surely released or not (step S1308). If the predetermined period of time has not elapsed, the count value of the second timer is incremented by one (step S1309), and the process returns to the step S1304. On the other hand, if the predetermined period of time has elapsed, it is determined that the key has been surely released, and the process returns to the step S1301.

A description will now be given of a fourth embodiment of the present invention.

In the fourth embodiment, even if a key is continuously depressed, repeated transmission of a control signal (light signal) corresponding to the key is not carried out depending on the type of the key.

Namely, depending on the type of a depressed key, the same control signal corresponding to the key does not have to be repeatedly transmitted during the depression of the key insofar as the control signal corresponding to the key is properly transmitted once to the controlled apparatus 50.

For example, a control signal indicative of an instruction for switching channels by designating a TV channel number, a control signal indicative of an instruction for switching between TV input and video input, a control signal indicative of an instruction for selectively turning on/off a function switch, and so forth are not suitable for repeated operation carried out by the controlled apparatus 50, and hence as to keys for transmitting such control signals, the same control signal does not have to be repeatedly transmitted even if the keys are continuously depressed.

Therefore, in the fourth embodiment, when an "ACK" signal or the like indicative of normal reception is returned in response to such a control signal, repeated transmission of the control signal is not carried out.

The inhibition of repeated transmission saves power for the remote controller 1. Further, due to the elimination of unnecessary infrared emission, the period of time for which no infrared is emitted is increased, and hence even if another apparatus to be controlled by infrared is located in the vicinity of the controlled apparatus 50, it is possible to prevent an infrared communication conflict and prevent e.g. malfunction of the apparatuses to be controlled.

Figure 14:
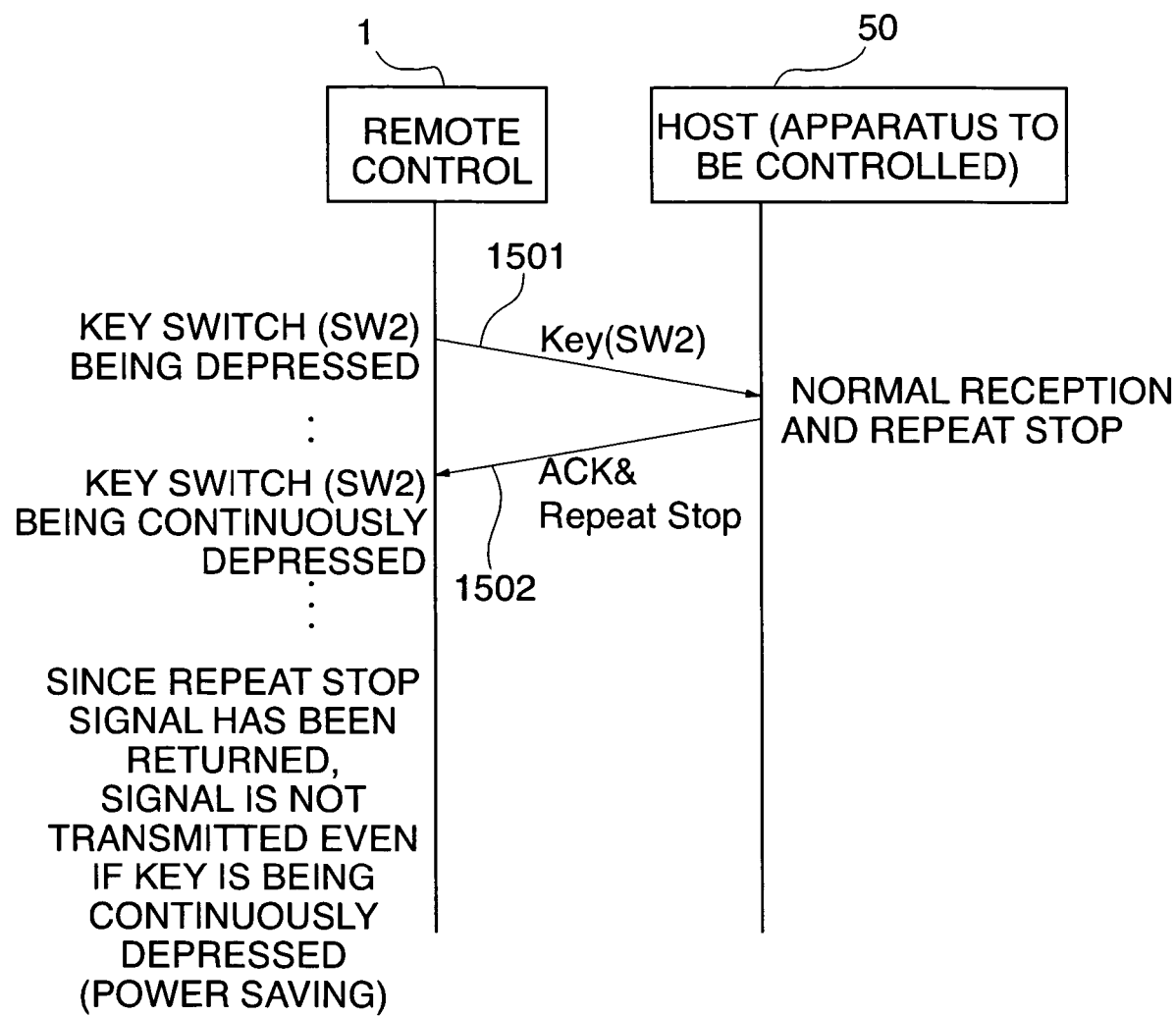
FIG. 14 is a view schematically showing a procedure for carrying out transmission between a remote controller and an apparatus to be controlled according to a fourth embodiment of the present invention (in the case where a repeat stop signal as well as an "ACK" signal are returned)

FIG. 14 is a view schematically showing a procedure for carrying out communication between the remote controller 1 and the controlled apparatus 50 according to the fourth embodiment. When an arbitrary key switch SW2 of the remote controller 1 (refer to FIG. 1) is depressed, a light signal 1501. with the format in FIG. 5 is transmitted. If normally receiving the light signal 1501, the controlled apparatus 50 returns an "ACK" signal which acknowledges normal reception and a repeat stop signal 1502 to the remote controller 1, and provides control, not shown, corresponding to the key switch SW2.

The remote controller 1 recognizes that the controlled apparatus 50 has normally received the light signal 1501 due to the reception of the "ACK" signal, and stops transmitting a control signal corresponding to the key switch SW2 due to the reception of the repeat stop signal 1502 even if the key switch SW2 is continuously depressed.

In the fourth embodiment, the controlled apparatus 50 has a function of determining whether a received control signal is suitable for repeated control or not; the controlled apparatus 50 is configured to return a repeat stop signal when it determines that the received control signal is not suitable for repeated control. This function is executed by the MPU 51 in accordance with the corresponding program.

A description will now be given of a control signal transmitting process according to the fourth embodiment with reference to a flow chart of FIG. 15

Figure 15:
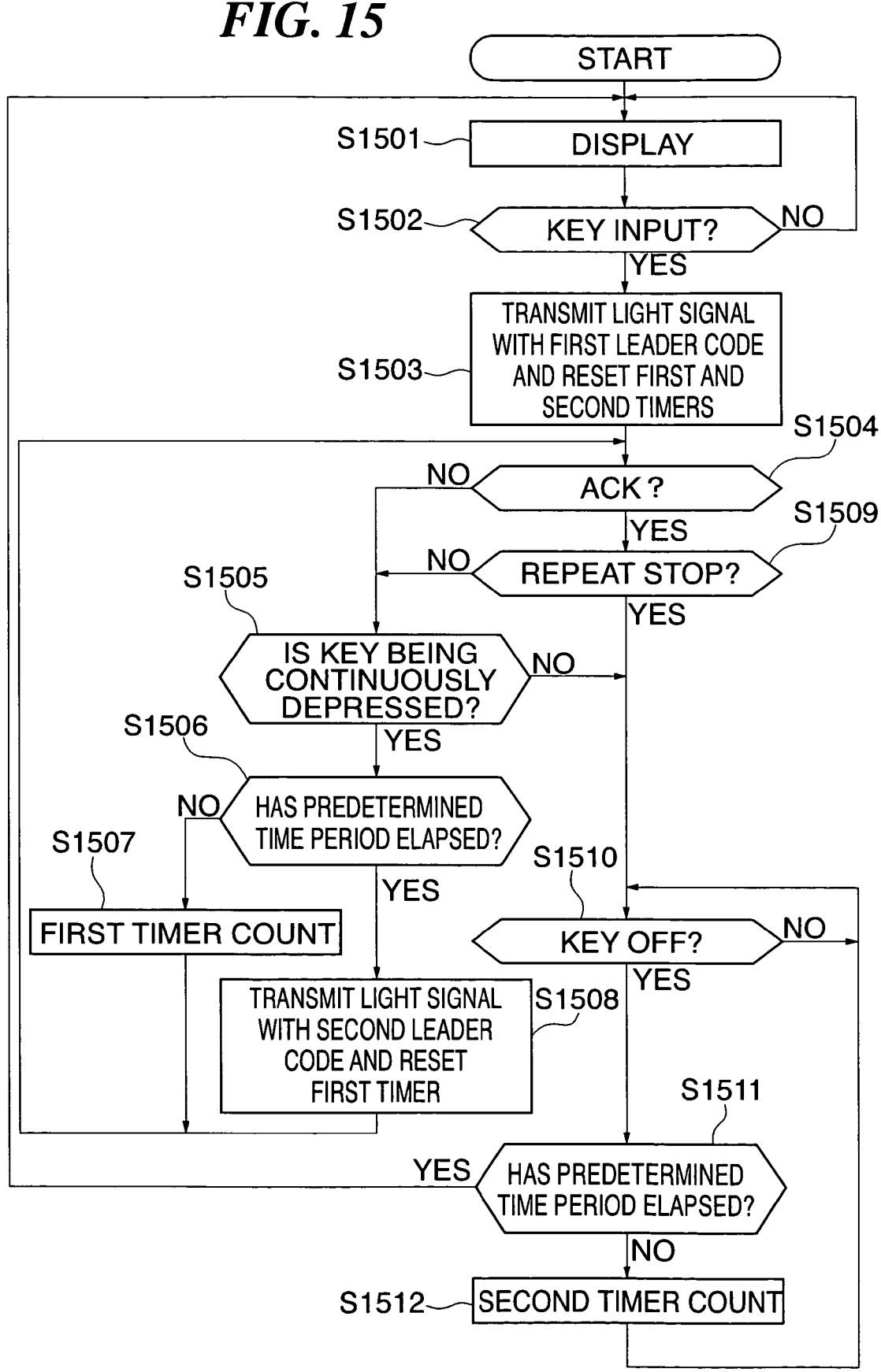
FIG. 15 is a flow chart showing a control signal transmitting process according to the fourth embodiment.

As shown in FIG. 15, display processing is carried out in a step S1501, in which data to be displayed is selected from data in the data memory 6 appearing in FIG. 3 and is displayed. Next, it is determined whether there has been a key input or not (step S1502), and if there has been no key input, the process returns to the step S1501, so that the steps S1501 and S1502 are executed again. If there has been a key input, the process proceeds to a step S1503 wherein a light signal corresponding to the input key is transmitted, and the count values of the first timer and the second timer provided on the data memory 6 are reset. The first leader code in FIG. 12A is used as a leader code for the light signal transmitted in the step S1303 since it is transmitted for the first time.

Then, it is determined whether or not an "ACK" signal has been returned from the controlled apparatus 50 (step S1504). If the "ACK" signal has not been returned, it is then determined whether or not the corresponding key is being continuously depressed (step S1505). If the key is not being continuously depressed, the process proceeds to a step S1510, described later.

On the other hand, if the key is being continuously depressed, the process proceeds to a step S1506 wherein a determination as to whether a predetermined period of time has elapsed or not is made by determining whether the count value of the first timer has become equal to a predetermined value or not. If the predetermined period of time has not elapsed, the count value of the first timer is incremented by one (step S1507), and the process then returns to the step S1504.

On the other hand, if the predetermined period of time has elapsed, a light signal corresponding to the input key is transmitted, and the counter value of the first timer is reset (step S1508). The second leader code in FIG. 12B is used as a leader code for the light signal transmitted in the step S1508 since it is transmitted for the second or subsequent time.

If it is determined in the step S1504 that the "ACK" signal has been returned, it is determined whether or not a repeat stop signal and the "ACK" signal have been simultaneously returned (step S1509). If only the "ACK" signal has been returned, the process proceeds to the step S1505 wherein it is determined whether the key is being continuously depressed or not.

As described above, since the process returns from the step S1508 to the step S1504, the same light signal as the one transmitted in the step S1508 is thereafter continuously transmitted at predetermined time intervals clocked by the first timer while the key is being depressed. Therefore, even if the light signal is temporarily blocked by an obstacle or the like, it can be surely received by the controlled apparatus 50 when the obstacle or the like is removed.

Further, as described above, the controlled apparatus 50 does not return a repeat stop signal in response to a control signal suitable for repeated control, and hence a control signal relating to an operation suitable for repeated control such as volume control is repeatedly transmitted by continuously depressing the corresponding key.

If it is determined in the step S1509 that the repeat stop signal and the "ACK" signal have been simultaneously returned, a determination as to whether or not the key has been released is made (step S1510). If the key has not been released, the determination is continuously made.

On the other hand, if the key has been released, whether the count value of the second timer has become equal to a predetermined value or not is determined so as to determine whether the key has been released for the predetermined period of time or not, i.e. whether the key has been surely released or not (step S1511). If the count value of the second timer has not become equal to the predetermined value, the count value of the second timer is incremented by one (step S1512), and the process returns to the step S1510. On the other hand, if the count value of the second timer has become equal to the predetermined value, it is determined that the key has been surely released, and the process returns to the step S1501.

As a result, in the case where a repeat stop signal as well as an "ACK" signal have been received, even if a key corresponding to a control signal unsuitable for repeated control is thereafter continuously depressed, repeated transmission of the control signal corresponding to the key is not carried out.

Next, a description will be given of the operation of the controlled apparatus 50 according to the fourth embodiment with reference to a flow chart of FIG. 16.

Figure 16:
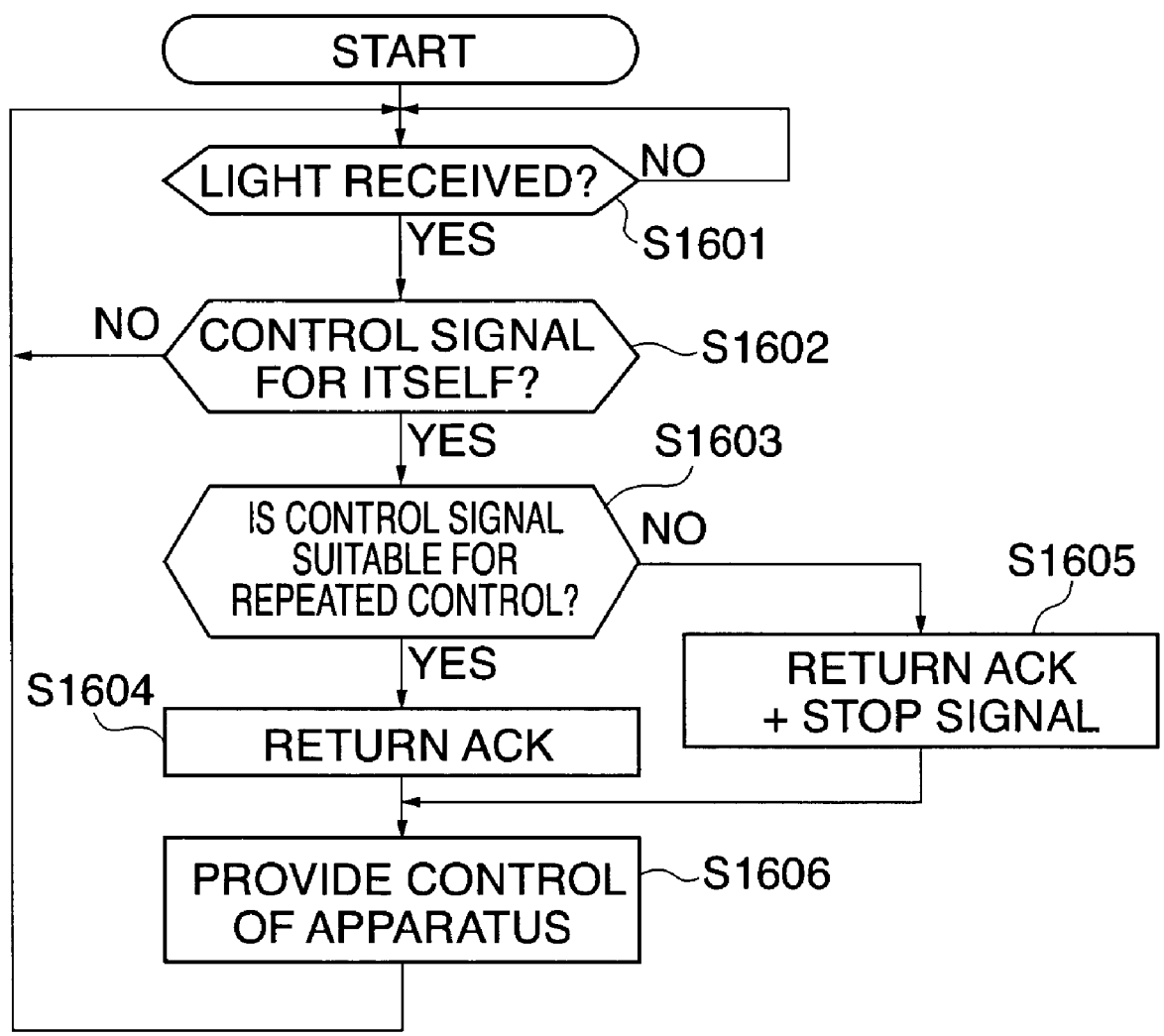
FIG. 16 is a flow chart showing the operation of an apparatus to be controlled according to the fourth embodiment.

As shown in FIG. 16, the controlled apparatus 50 waits for reception of infrared light by the infrared light receiving section 52 (refer to FIG. 1) (step S1601). Upon receipt of infrared light, the controlled apparatus 50 determines whether or not the received infrared light is a control signal directed to the controlled apparatus 50, and the control signal has been normally received (step S1602). If the control signal directed to the controlled apparatus 50 has not been normally received, the process returns to the step S1601.

On the other hand, if the control signal directed to the controlled apparatus 50 has been normally received, the controlled apparatus 50 determines whether the control signal is suitable for repeated control or not (step S1603). If the control signal is suitable for repeated control, the controlled apparatus 50 returns an "ACK" signal to the remote controller 1 (step S1604), and carries out processing (operation) according to the control signal (step S1606). The process then returns to the step S1601 wherein the next reception of infrared is awaited.

On the other hand, if the control signal is not suitable for repeated control, the controlled apparatus 50 returns a repeat stop signal as well as the "ACK" signal to the remote controller 1 (step S1605), and carries out processing (operation) according to the control signal (step S1606). The process then returns to the step S1601 wherein the next reception of infrared is awaited.

In the above description, an infrared light signal from the remote controller 1 is formatted as shown in FIG. 11, but may be formatted as shown in FIG. 5. In this case, in the step S1503 in FIG. 15, a signal with a packet number "00" is transmitted so as to indicate that the signal is transmitted for the first time, and in the step S1508, a signal with a packet number other than the packet number "00" is transmitted.

A description will now be given of a fifth embodiment of the present invention.

In the above described first to fourth embodiments, it is assumed that only a control signal with a single frame is transmitted, but in the fifth embodiment, it is assumed that not only a control signal with a single frame but also a control signals with multi frames is transmitted.

Figure 17:
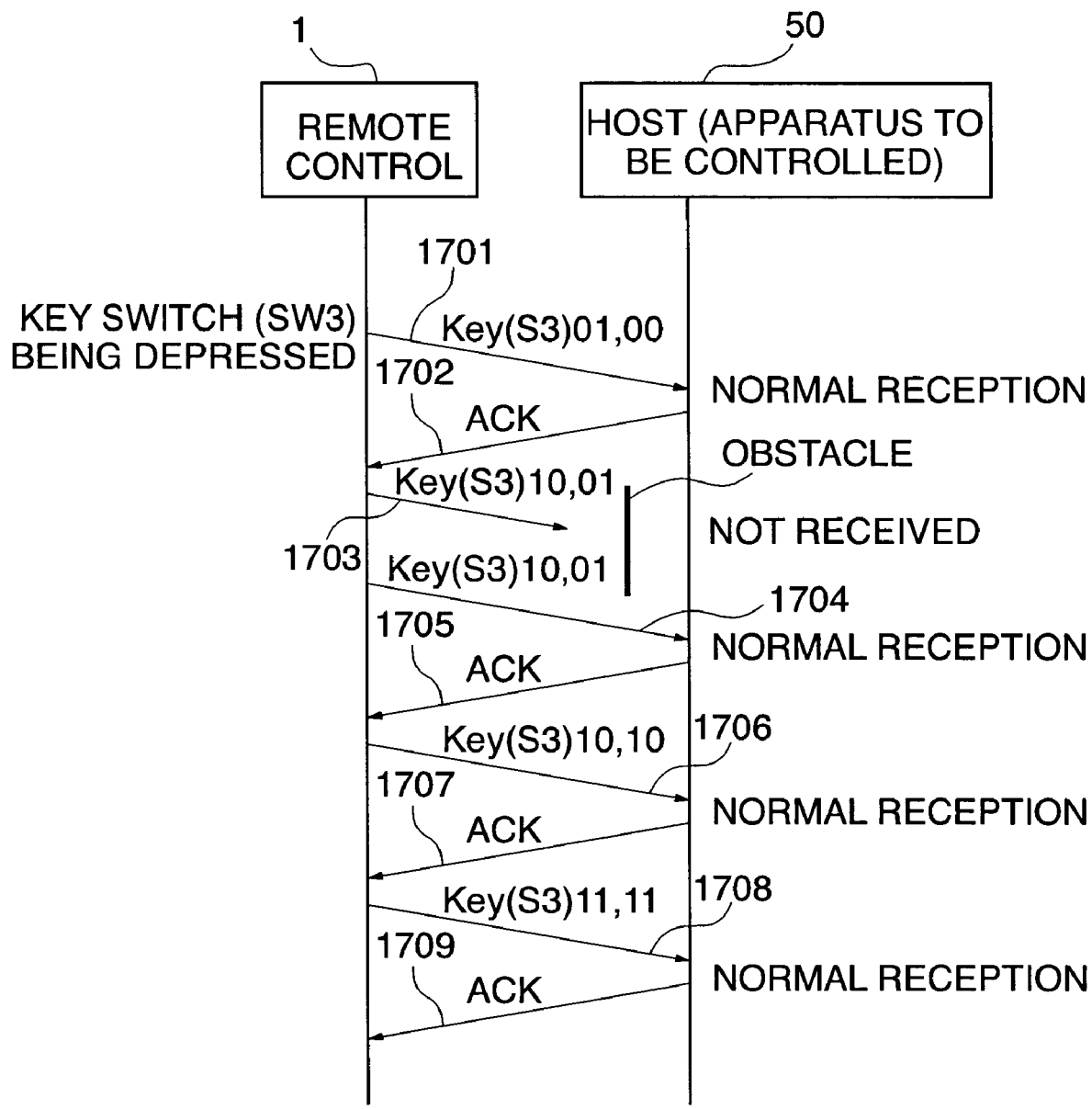
FIG. 17 a view schematically showing a procedure for carrying out transmission between a remote controller and an apparatus to be controlled according to a fifth embodiment of the present invention (in the case of multi frames)

FIG. 17 is a view schematically showing a procedure for carrying out communication between a remote controller and an apparatus to be controlled according to the fifth embodiment.

As shown in FIG. 17, when a key switch SW3 (refer to FIG. 3) corresponding to a control signal with multi frames is depressed, the remote controller 1 transmits an infrared light signal 1701 whose communication type 505 is "01" indicative of the first frame and whose packet number 506 is "00" in the format in FIG. 5. Upon normal receipt of the light signal 1701, the controlled apparatus 50 returns an "ACK" signal 1702 which acknowledges normal reception to the remote controller 1, and stores the received light signal 1701 in a memory thereof to wait for reception of the next frame data.

Upon receipt of the "ACK" signal 1702, the remote controller 1 transmits the next frame data as a light signal 1703 in the same format as the previous frame, and whose communication type 505 is "00" indicative of an intermediate frame and packet number 506 has been changed to "01".

However, if the light signal 1703 has not been received by the controlled apparatus 50 due to the presence of an obstacle or the like, and hence the "ACK" signal has not been returned from the controlled apparatus 50, the remote controller 1 transmits a light signal 1704 just identical with the light signal 1703.

Here, if the obstacle or the like has been removed, and controlled apparatus 50 normally receives the light signal 1704, the controlled apparatus 50 returns an "ACK" signal 1705 and stores the light signal 1704 as the second frame data in the memory.

Upon receipt of the "ACK" signal, the remote controller 1 transmits the third frame data as a light signal 1706 whose communication type 505 is "10" indicative of an intermediate frame and packet number 506 has been changed to "10". Upon normal reception of the light signal 1706, the controlled apparatus 50 returns an "ACK" signal 1707 to the remote controller 1, and stores the light signal 1706 as the third frame-data in the memory.

Upon receipt of the "ACK" signal 1707, the remote controller 1 transmits fourth frame data i.e. final frame data as a light signal 1708 whose communication type 505 is "11" indicative of the last frame and the packet number 506 has been changed to "11". Upon normal reception of the light signal 1708, the controlled apparatus 50 returns an "ACK" signal 1709 to the remote controller 1, and stores the light signal 1708 as the fourth frame data in the memory. Then, the controlled apparatus 50 provides suitable control according to the data which has been sequentially stored in the memory.

A description will now be given of a control signal transmitting process according to the fifth embodiment with reference to flow charts of FIGS. 18 and 19.

Figure 18:
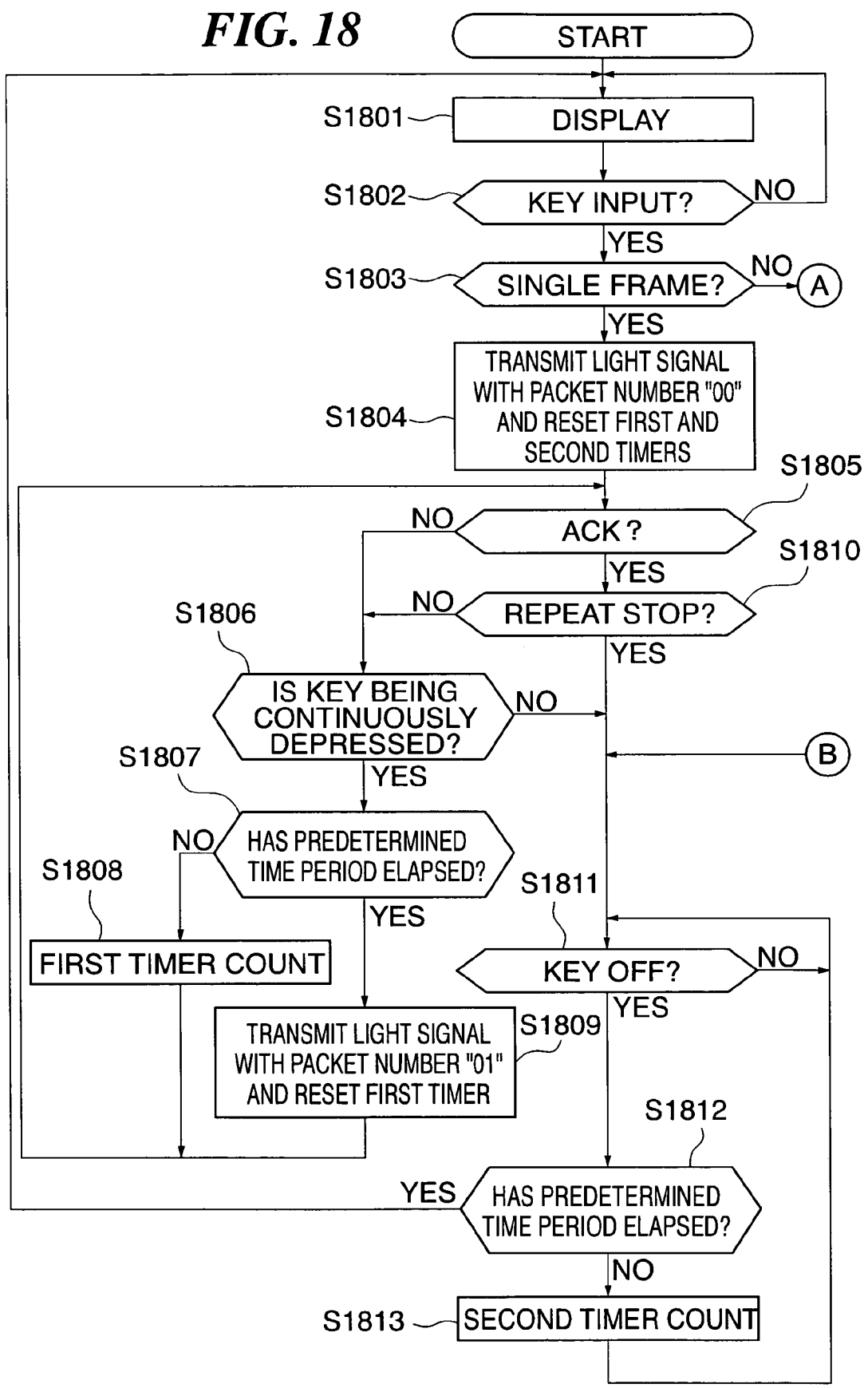
FIG. 18 is a flow chart showing a control signal transmitting process according to the fifth embodiment.
Figure 19:
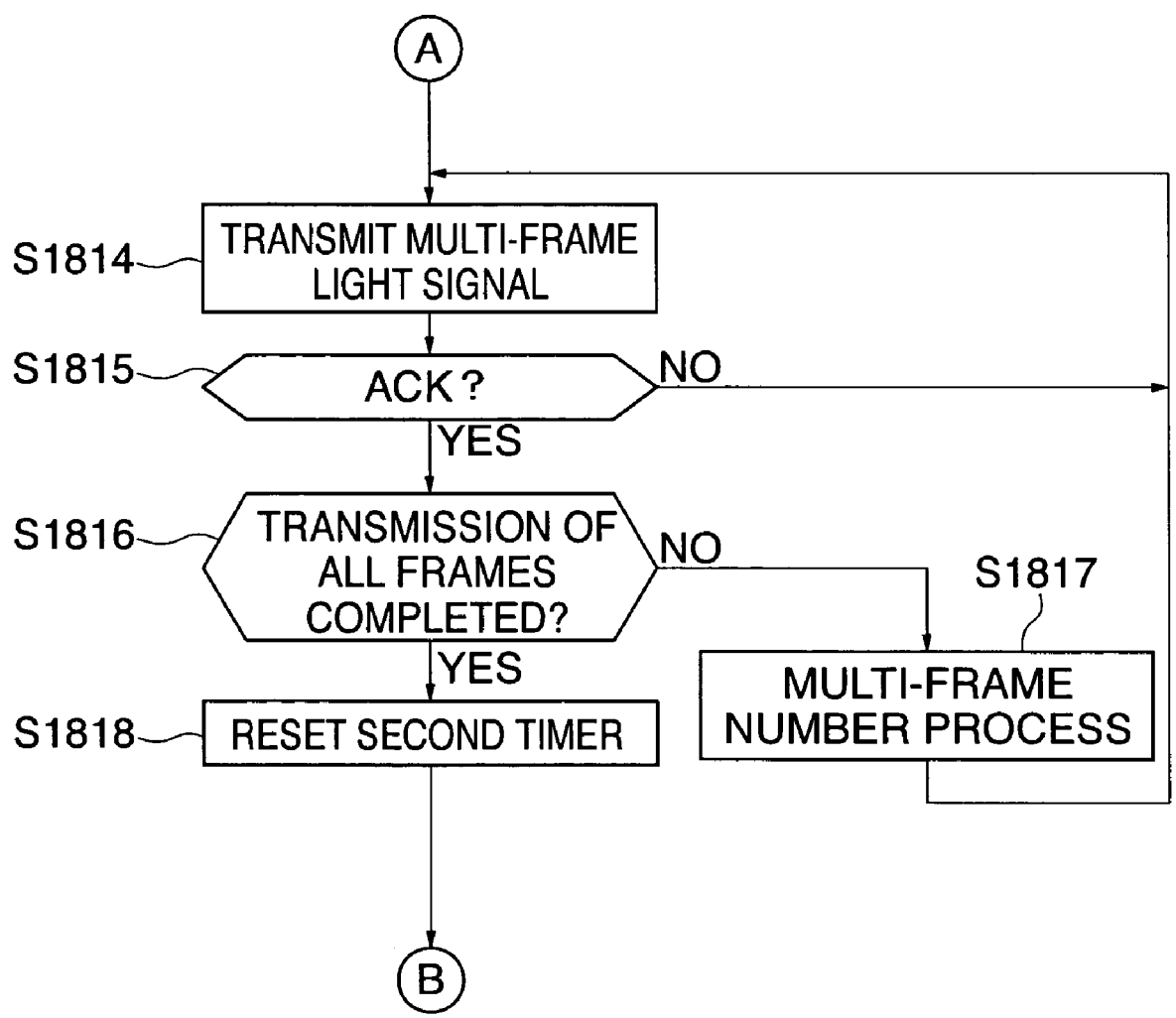
FIG. 19 is a continued part of the flow chart in FIG. 18.

As shown in FIG. 18, in a step S801, display processing is carried out, in which data to be displayed is selected from data in the data memory 6 appearing in FIG. 3 and is displayed. Next, it is determined whether there has been a key input or not (step S1802), and if there has been no key input, the process returns to the step S1801, so that the steps S1801 and S1802 are executed again.

If there has been a key input, whether a control signal to be transmitted is a single-frame control signal or not is determined according to the key input (step S1803). If the control signal to be transmitted is a single-frame control signal, the process proceeds to a step S1804 wherein a single-frame control signal (light signal) corresponding to the key input is transmitted, and the count values of the first timer and the second timer provided on the data memory 6 are reset. A code "00" is assigned as a packet number for the light signal transmitted in the step S1804 since it is transmitted for the first time.

Then, it is determined whether or not an "ACK" signal has been returned from the controlled apparatus 50 (step S1805). If the "ACK" signal has not been returned, it is then determined whether or not the corresponding key is being continuously depressed (step S1806). If the key is not being continuously depressed, the process proceeds to a step S1811, described later.

On the other hand, if the key is being continuously depressed, the process proceeds to a step S1807 wherein a determination as to whether a predetermined period of time has elapsed or not is made by determining whether the count value of the first timer has become equal to a predetermined value or not. If the predetermined period of time has not elapsed, the count value of the first timer is incremented by one (step S1808), and the process then returns to the step S1805.

On the other hand, if the predetermined period of time has elapsed, a light signal corresponding to the input key is transmitted, and the counter value of the first timer is reset (step S1809), and then the process returns to the step S1805. A code "01" is fixedly assigned as a packet number for the light signal transmitted in the step S1809 since it is transmitted for the second or subsequent time.

If it is determined in the step S1805 that the "ACK" signal has been returned, it is determined whether or not a repeat stop signal and the "ACK" signal have been simultaneously returned (step S1810). If only the "ACK" signal has been returned, the process proceeds to the step S1806 wherein it is determined whether the key is being continuously depressed or not.

As described above, since the process returns from the step S1809 to the step S1805, the same light signal as the one transmitted in the step S1809 is thereafter continuously transmitted at predetermined time intervals clocked by the first timer until the "ACK" signal is returned while the key is being depressed. Therefore, even if the light signal is temporarily blocked by an obstacle or the like, the light signal can be surely received by the controlled apparatus 50 when the obstacle or the like is removed.

Further, as described above, the controlled apparatus 50 does not return a repeat stop signal in response to a control signal suitable for repeated control, and hence a control signal relating to an operation suitable for repeated control such as volume control is repeatedly transmitted by continuously depressing the corresponding key.

If it is determined in the step S1810 that the repeat stop signal and the "ACK" signal have been simultaneously returned, a determination as to whether the key has ceased to be depressed or not is made (step S1811), and if the key has not ceased to be depressed, the determination is continuously made.

On the other hand, if the key has ceased to be depressed, whether the count value of the second timer has become equal to a predetermined value or not is determined so as to determine whether the key has ceased to be depressed for the predetermined period of time or not, i.e. whether the key has surely ceased to be depressed or not (step S1812). If the count value of the second timer has not become equal to the predetermined value, the count value of the second timer is incremented by one (step S1813), and the process returns to the step S1811. On the other hand, if the count value of the second timer has become equal to the predetermined value, it is determined that the key has surely ceased to be depressed, and the process returns to the step S1801.

As a result, in the case where a repeat stop signal as well as an "ACK" signal has been received in response to a single-frame control signal, even if a key corresponding to a control signal unsuitable for repeated control is thereafter continuously depressed, repeated transmission of the control signal corresponding to the key is not carried out.

If it is determined in the step S1803 according to the key input that it is determined that the control signal to be transmitted is not a single-frame control signal, a light signal of one frame is transmitted whose communication type ("505" in FIG. 5) and packet number ("506" in FIG. 5) have been changed to codes corresponding to multi frames as described above (step S1814).

Next, it is determined whether or not an "ACK" signal has been returned from the controlled apparatus 50 (step S1815). If the "ACK" signal has not been returned, the process returns to the step S1814 wherein a light signal of the same frame is transmitted again. Namely, in the case of multi frames, if an "ACK" signal has not been returned, the same light signal is transmitted again without determining whether or not the key is being continuously depressed.

On the other hand, if the "ACK" signal has been returned, it is determined whether all the frames have been transmitted or not (step S1816). If all the frames have not yet been transmitted, the communication type (505) and the packet number (506) are updated. (step S1817), and the process returns to the step S1814 wherein a light signal with the next frame data is transmitted. If all the frames have been transmitted, the count value of the second timer is reset (step S1818), and the process proceeds to the step S1811.

As described above, according to the present embodiment, repeated transmission inhibition control is not provided for a control signal with multi frames during key depression. This is because although it takes a relatively long period of time to completely transmit multi frames, the period of time required for transmission is only a little shorter than the ON time of a key switch during one key operation, and hence power cannot be saved effectively even if repeated transmission is not carried out.

However, even in the case of multi frames, if they can be transmitted within a short period of time, repeated transmission inhibition control may be provided during key depression as is the case with a single frame.

Next, a description will be given of a sixth embodiment of the present invention, In the above described fourth and fifth embodiments, the controlled apparatus 50 determines whether to inhibit repeated transmission and gives an instruction for inhibiting repeated transmission, but in the sixth embodiment, the remote controller 1 itself determines whether to inhibit repeated transmission and inhibits repeated transmission.

A description will now be given of a control signal transmitting process according to the sixth embodiment with reference to a flow chart of FIG. 20.

Figure 20:
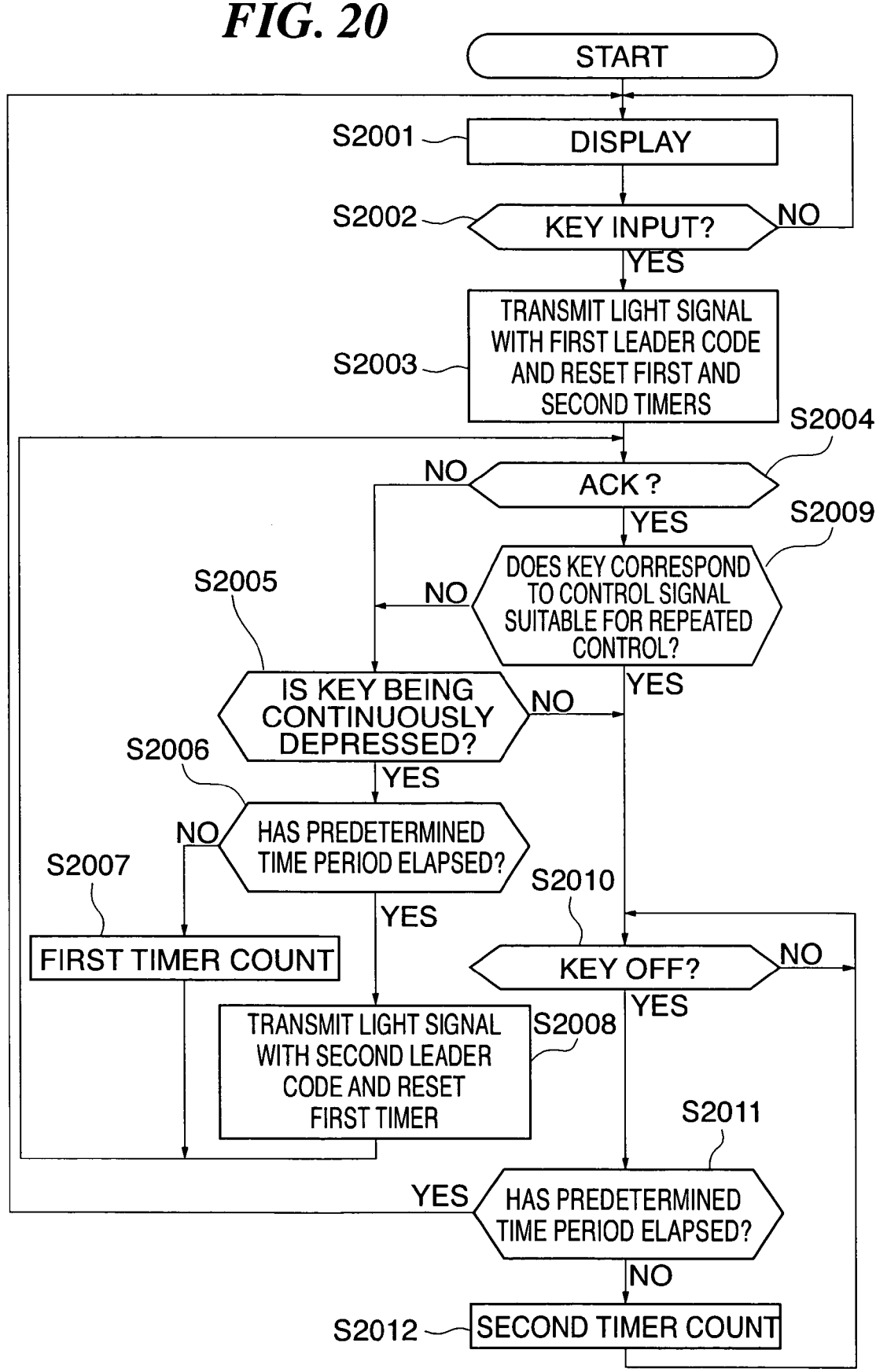
FIG. 20 is a flow chart showing a control signal transmitting process according to a sixth embodiment of the present invention (in the case where a remote controller voluntarily determines whether to repeatedly transmit a control signal)

As shown in FIG. 20, in a step S2001, display processing is carried out, in which data to be displayed is selected from data in the data memory 6 appearing in FIG. 3 and is displayed. Next, it is determined whether there has been a key input or not (step S2002), and if there has been no key input, the process returns to the step S2001, so that the steps S2001 and S2002 are executed again.

If there has been a key input, the process proceeds to a step S2003 wherein a light signal as a control signal corresponding to the key input is transmitted, and the count values of the first timer and the second timer provided on the data memory 6 are reset. The first leader code in FIG. 12A is used as a leader code for the light signal transmitted in the step S2003 since it is transmitted for the first time.

Then, it is determined whether or not an "ACK" signal has been returned from the controlled apparatus 50 (step S2004). If the "ACK" signal has not been returned, it is determined whether or not the corresponding key is being continuously depressed (step S2005). If the key is not continuously depressed, the process proceeds to a step S2010, described later.

On the other hand, if the key is being continuously depressed, whether a predetermined period of time has elapsed or not is determined by making a determination as to whether the count value of the first timer has become equal to a predetermined value or not (step S2006). If the predetermined period of time has not elapsed, the count value of the first timer is incremented by one (step S2007), and the process returns to the step S2004.

On the other hand, if the predetermined period of time has elapsed, a light signal corresponding to the input key is transmitted, and the counter value of the first timer is reset (step S2008). The process then returns to the step S2004. The second leader code in FIG. 12B is used as a leader code for the light signal transmitted in the step S2008 since it is transmitted for the second or subsequent time.

If it is determined in the step S2004 that the "ACK" signal has been returned, it is determined whether the key corresponds to a control signal suitable for repeated control or not (step S2009). It should be noted that keys corresponding to control signals suitable for repeated control include a key for controlling the volume, and keys for changing the viewing direction/magnification (zoom) of a monitor camera, and keys corresponding to control signals unsuitable for repeated control include numerical keys, and keys for selectively turning on/off specific functions.

If it is determined in the step S2009 that the key corresponds to a control signal suitable for repeated control, the process proceeds to the step S2005. Thus, if the key is thereafter continuously depressed, the same light signal as the one transmitted in the step S2003 is continuously transmitted at predetermined intervals clocked by the fist timer until the "ACK" signal is returned. Therefore, even if the light signal is temporarily blocked by an obstacle or the like, the light signal can be surely received by the controlled apparatus 50 when the obstacle or the like is removed.

If it is determined in the step S2009 that the key corresponds to a control signal unsuitable for repeated control, it is then determined whether the key has been released or not (step S2010). If the key has not been released, the determination is continuously made.

On the other hand, if it is determined that the key has been released, a determination as to whether the count value of the second timer has become equal to a predetermined value or not is made so as to determine whether the key has been released for a predetermined period of time or not, i.e. whether the key has surely ceased to be depressed or not (step S2011). If the count value of the second timer has not become equal to the predetermined value, the count value of the second timer is incremented by one (step S2012), and the process returns to the step S2010. On the other hand, if the count value of the second timer has become equal to the predetermined value, it is determined the key has surely ceased to be depressed, and the process returns to the step S2001.

As described above, according to the present embodiment, the same results as those of the above described fifth embodiment can be obtained. Further, repeat transmission inhibition can be carried out irrespective of the specifications of the controlled apparatus 50.

According to the above described embodiments of the present invention, even if a key corresponding to a control signal unsuitable for repeated control is continuously depressed, repeated transmission of the control signal corresponding to the key is inhibited to save power for the remote controller 1. Further, due to the elimination of unnecessary infrared emission, the period of time for which no infrared is emitted is increased, and hence even if another apparatus to be controlled by infrared is located in the vicinity of the controlled apparatus 50, it is possible to prevent an infrared communication conflict and prevent e.g. malfunction of the apparatuses to be controlled.

It is to be understood that the object of the present invention may also be accomplished by supplying a system or an apparatus with a storage medium (or a recording medium) in which a program code of software which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and a storage medium on which the program code is stored constitute the present invention.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the program code may be implemented by an object code, a program which is executed by an interpreter, script data which is supplied to an OS, and so forth insofar as the functions of any of the above described embodiments can be realized by a computer.

Examples of the storage medium for supplying the program code include a RAM, an NV-RAM, a floppy (registered trademark) disk, an optical disk, a magnetic-optical disk, a CD-ROM an MO, a CD-R, a CD-RW, a DVD-ROM, a DVD-RAM, a DVD-RW, a DVD+RW, a magnetic tape, a nonvolatile memory card, and a ROM,.which can store the program code. Alternatively, the program code may be downloaded from another computer or a database, not shown, connected to the Internet, a commercial network, or a local area network.

What is claimed is:

1. A remote control system comprising:
   a remote control apparatus; and
   a first apparatus controlled by said remote control apparatus;
   wherein said remote control apparatus comprises: at least one key switch for remote control; and a first transmitting device that repeatedly transmits a control signal corresponding to said key switch while said key switch is being operated and that inhibits the transmission of the control signal in accordance with reception of a predetermined signal from said first apparatus;
   wherein said first apparatus comprises: a first determination device that determines whether the control signal, transmitted by said first transmitting device, is suitable for repeated control; and a second transmitting device that transmits an inhibition instruction signal for inhibiting said first transmitting device from repeatedly transmitting the control signal in according with a determination by said first determination device.

2. A remote control system according to claim 1, wherein said first apparatus comprises:
   a second determination device that determines whether the control signal transmitted by said first transmitting device has been normally received; and
   wherein said second transmitting device transmits the inhibition instruction signal and an acknowledgement signal indicative of normal reception of the control signal when said second determination device determines that the control signal has been normally received, and said first determination device determines that the control signal is unsuitable for repeated control.

3. A remote control system comprising:
   a remote control apparatus; and
   a first apparatus controlled by said remote control apparatus;

wherein said remote control apparatus comprises: at least one key switch for remote control; and a first transmitting device that repeatedly transmits a control signal corresponding to said key switch while said key switch is being operated and that inhibits the transmission of the control signal in accordance with reception of a predetermined signal from said first apparatus;

wherein said remote control apparatus comprises: a first determination device that determines whether the control signal corresponding to said key switch, transmitted by said first transmitting device, is suitable for repeated control; and a second determination device that determines whether a response to the control signal has been received from said first apparatus; and wherein said first transmission device is operable to inhibit repeated transmission of the control signal when said first determination device determines that the control signal is unsuitable for repeated control, and said second determination device determines that the response has been received.

4. An electronic apparatus that is remotely controlled by a remote control apparatus, comprising:
   a first determination device that determines whether a control signal transmitted by the remote control apparatus is suitable for repeated control; and
   a transmitting device that transmits an inhibition instruction signal for inhibiting repeatedly transmission of the control signal in accordance with a determination by said first determination device.

5. An electronic apparatus according to claim 4, further comprising a second determination device that determines whether the control signal has been normally received; and
   wherein said transmitting device transmits the inhibition instruction signal and an acknowledgement signal indicative of normal reception of the control signal when said second determination device determines that the control signal has been normally received, and said first determination device determines that the control signal is unsuitable for repeated control.

6. A remote control method of remotely controlled by a remote control apparatus, comprising:
   a first determination step of determining whether a same control signal repeatedly transmitted by the remote control apparatus is suitable for repeated control; and
   a transmitting step of transmitting an inhibition instruction signal for inhibiting the repeatedly transmission of the control signal in accordance with a determination in said first determination step.

7. A program for causing a computer to execute a remote control method of remotely controlled by a remote control apparatus, comprising:
   a first determination module for determining whether a control signal transmitted by the remote control apparatus is suitable for repeated control; and
   a transmitting module for transmitting an inhibition instruction signal for inhibiting repeated transmission of the control signal in accordance with a determination in said first determination module.

8. A remote control system comprising:
   a remote control apparatus; and
   a first apparatus controlled by said remote control apparatus;
   wherein said first apparatus comprises: a first determination device that determines whether a control signal has been normally received from said remote control apparatus; and a returning device that returns an acknowledgement signal indicative of normal reception of the control signal when said determination device determines that the control signal has been normally received; and wherein said remote control apparatus comprises: at least one key switch for remote control; a transmitting device that repeatedly transmits a control signal corresponding to said key switch while said key switch is being operated; a second determination device that determines whether the control signal corresponding to said key switch is suitable for repeated control when the acknowledgement signal is returned from the apparatus to be controlled; and an inhibition device that inhibits said transmitting device from repeatedly transmitting the control signal when said second determination device determines that the control signal corresponding to said key switch is unsuitable for repeated control.

9. A remote control apparatus that remotely controls a first apparatus; comprising:
   at least one key switch for remote control;
   a transmitting device that repeatedly transmits a control signal corresponding to said key switch while said key switch is being operated;
   a determination device that determines whether the control signal is suitable for repeated control when an acknowledgement signal indicative of normal reception of the control signal is returned from the apparatus to be controlled in response to the control signal; and
   an inhibition device that inhibits said transmitting device from repeatedly transmitting the control signal when said determination device determines that the control signal is unsuitable for repeated control.

10. A remote control method of remotely controlling a first apparatus by a remote control apparatus, comprising:
    a transmitting step of repeatedly transmitting a control signal corresponding to a key switch for remote control while the key switch is being operated;
    a determination step of determining whether the control signal is suitable for repeated control when an acknowledgement signal indicative of normal reception of the control signal is returned from the apparatus to be controlled in response to the control signal; and
    an inhibiting step of inhibiting repeated transmission of the control signal when it is determined in said determination step that the control signal is unsuitable for repeated control.

11. A program for causing a computer to execute a remote control method of remotely controlling a first apparatus by a remote control apparatus, comprising:
    a transmitting module for repeatedly transmitting a control signal corresponding to a key switch for remote control while the key switch is being operated;
    a determination module for determining whether the control signal is suitable for repeated control when an acknowledgement signal indicative of normal reception of the control signal is returned from the apparatus to be controlled in response to the control signal; and
    an inhibiting module for inhibiting repeated transmission of the control signal when it is determined by said determination module that the control signal is unsuitable for repeated control.

* * * * *